US012665703B2

(12) United States Patent
Maamari et al.

(10) Patent No.: US 12,665,703 B2
(45) Date of Patent: Jun. 23, 2026

(54) ADAPTIVELY DISABLING RE-TRANSMISSION BASED ON EXPERIENCED DELAY

(71) Applicant: QUALCOMM Incorporated, San Diego, CA (US)

(72) Inventors: Diana Maamari, San Diego, CA (US); Ahmed Elshafie, San Diego, CA (US); Mickael Mondet, Louannec (FR); Linhai He, San Diego, CA (US); Prashanth Haridas Hande, San Diego, CA (US); Huilin Xu, Temecula, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 18/066,256

(22) Filed: Dec. 14, 2022

(65) Prior Publication Data

US 2024/0204916 A1      Jun. 20, 2024

(51) Int. Cl.
| | |
|---|---|
| *H04L 1/08* | (2006.01) |
| *H04L 1/1812* | (2023.01) |
| *H04W 8/24* | (2009.01) |

(52) U.S. Cl.
CPC ............. *H04L 1/08* (2013.01); *H04L 1/1812* (2013.01); *H04W 8/24* (2013.01)

(58) Field of Classification Search
CPC ........... H04L 1/08; H04L 1/1812; H04W 8/24
See application file for complete search history.

(56) References Cited

U.S. PATENT DOCUMENTS

| | | | |
|---|---|---|---|
| 2023/0261802 A1* | 8/2023 | Kunt ..................... | H04L 1/1822 |
| | | | 370/329 |
| 2024/0129066 A1* | 4/2024 | Zhou ....................... | H04L 1/189 |
| 2024/0224376 A1* | 7/2024 | Yang ................. | H04W 52/0216 |
| 2024/0283578 A1* | 8/2024 | Rico Alvarino ...... | H04L 1/1854 |
| 2024/0284552 A1* | 8/2024 | Jiang .................... | H04L 1/1887 |

OTHER PUBLICATIONS

3GPP TS 38.321: "3rd Generation Partnership Project, Technical Specification Group Radio Access Network, NR, Medium Access Control (MAC) Protocol Specification (Release 17)", 3GPP TS 38.321, V17.2.0, Sep. 2022, pp. 1-249, pp. 57-59.

* cited by examiner

*Primary Examiner* — Abdullahi Ahmed
(74) *Attorney, Agent, or Firm* — QUALCOMM Incorporated

(57) ABSTRACT

An apparatus that may be a user equipment (UE) configured to identify that at least one characteristic time associated with a first uplink (UL) transmission is greater than a threshold time and to disable, based on the at least one characteristic time with the first UL transmission being greater than the threshold time, a retransmission capability. In some aspects, the apparatus may be a network node configured to identify that at least one characteristic time associated with a first downlink (DL) transmission is greater than a threshold time and to disable, based on the at least one characteristic time with the first DL transmission being greater than the threshold time, a retransmission capability.

30 Claims, 12 Drawing Sheets identify that at least one time period associated with a first uplink (UL) transmission is greater than a threshold time ~704 disable a retransmission capability of the UE based on the at least one time period associated with the first UL transmission being greater than the threshold time ~708

700

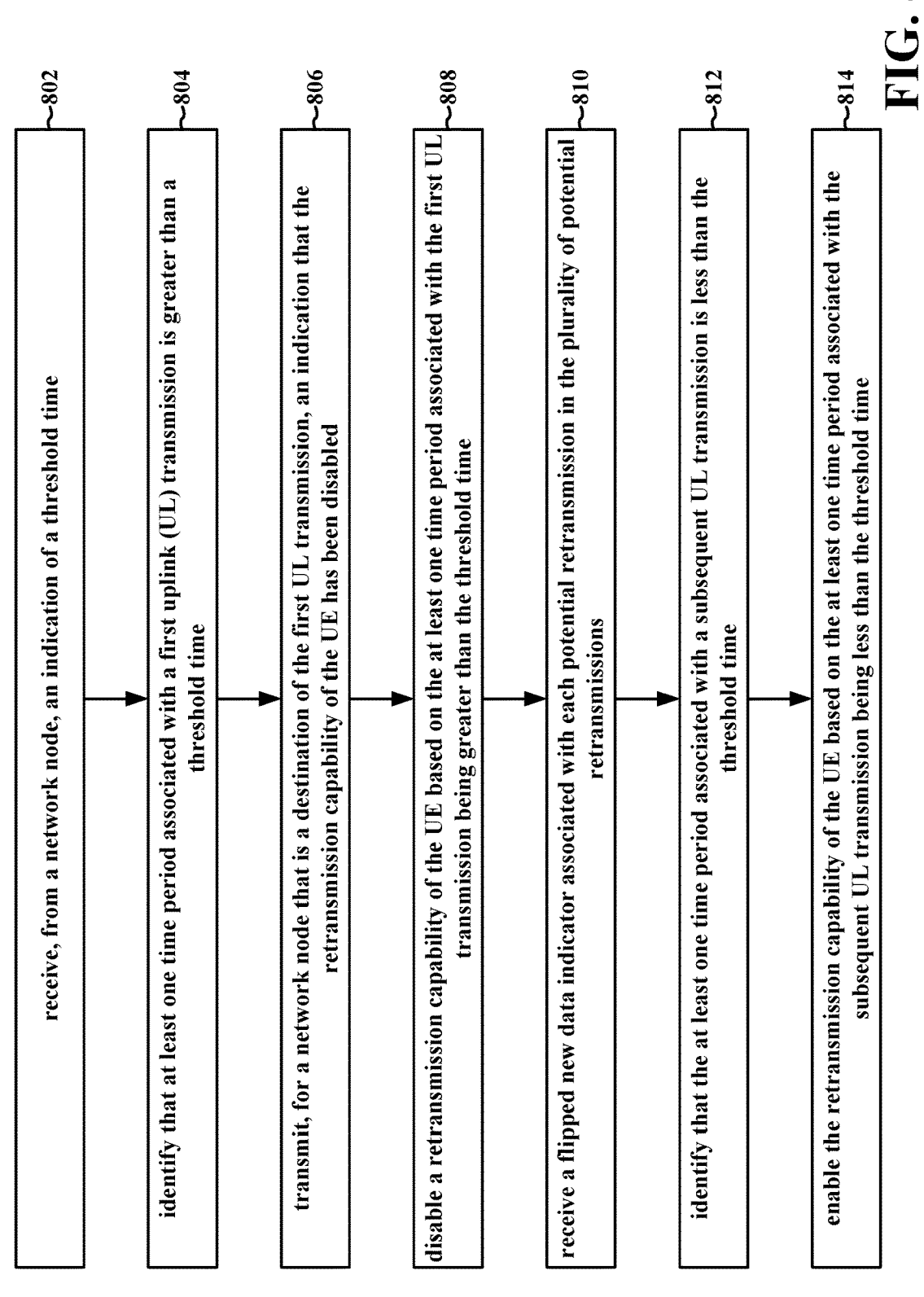

802 — receive, from a network node, an indication of a threshold time

804 — identify that at least one time period associated with a first uplink (UL) transmission is greater than a threshold time 806 — transmit, for a network node that is a destination of the first UL transmission, an indication that the retransmission capability of the UE has been disabled 808 — disable a retransmission capability of the UE based on the at least one time period associated with the first UL transmission being greater than the threshold time 810 — receive a flipped new data indicator associated with each potential retransmission in the plurality of potential retransmissions 812 — identify that the at least one time period associated with a subsequent UL transmission is less than the threshold time 814 — enable the retransmission capability of the UE based on the at least one time period associated with the subsequent UL transmission being less than the threshold time

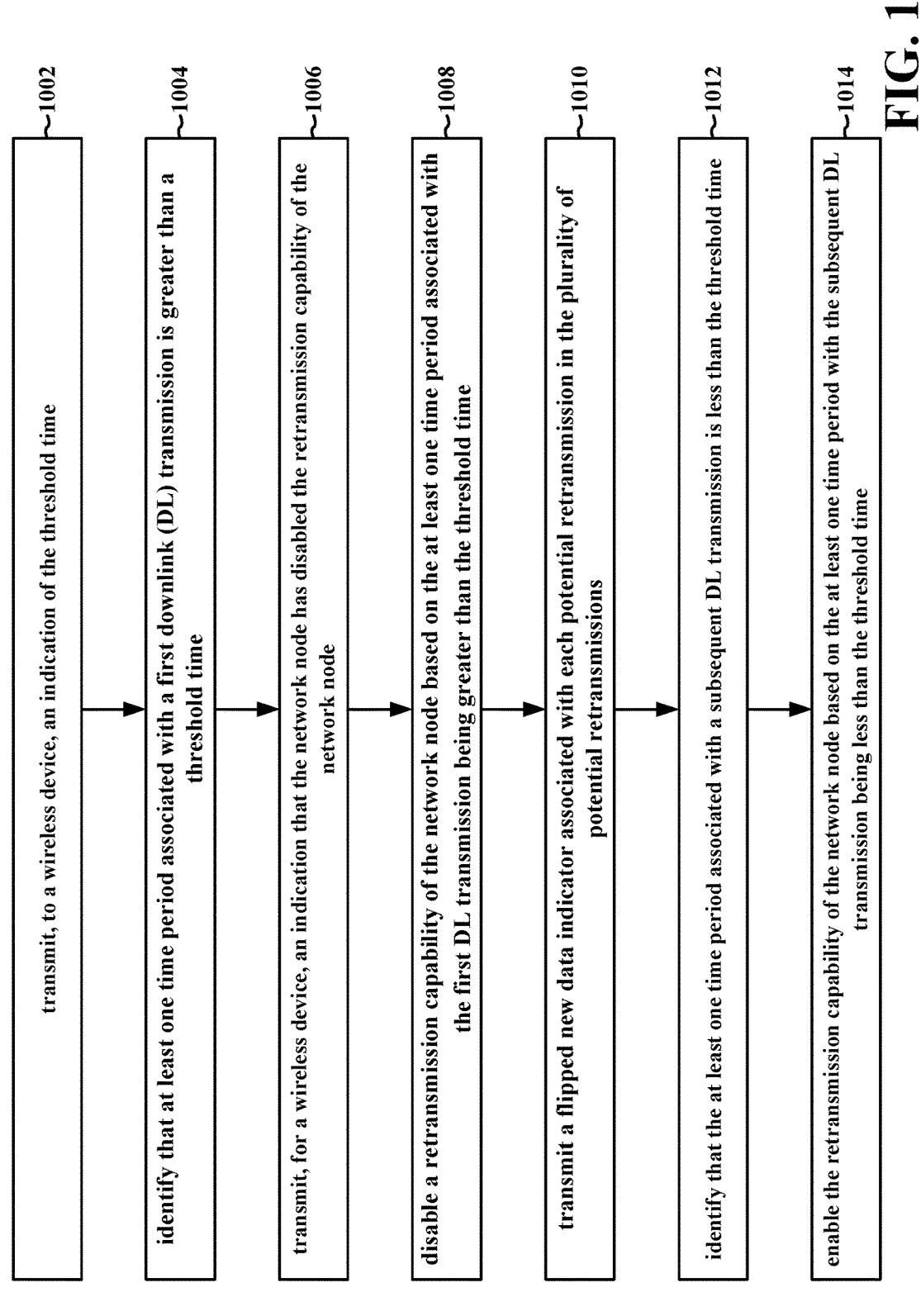

transmit, to a wireless device, an indication of the threshold time ~1002 identify that at least one time period associated with a first downlink (DL) transmission is greater than a threshold time ~1004 transmit, for a wireless device, an indication that the network node has disabled the retransmission capability of the network node ~1006 disable a retransmission capability of the network node based on the at least one time period associated with the first DL transmission being greater than the threshold time ~1008 transmit a flipped new data indicator associated with each potential retransmission in the plurality of potential retransmissions ~1010 identify that the at least one time period associated with a subsequent DL transmission is less than the threshold time ~1012 enable the retransmission capability of the network node based on the at least one time period associated with the subsequent DL transmission being less than the threshold time ~1014

ADAPTIVELY DISABLING RE-TRANSMISSION BASED ON EXPERIENCED DELAY

TECHNICAL FIELD

The present disclosure relates generally to communication systems, and more particularly, to wireless communication associated with short periodicity.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to identify that at least one characteristic time associated with a first uplink (UL) transmission is greater than a threshold time. The apparatus may further be configured to disable, based on the at least one characteristic time with the first UL transmission being greater than the threshold time, a retransmission capability.

In an aspect of the disclosure, a method, a computer-readable medium, and an apparatus are provided. The apparatus may be configured to identify that at least one characteristic time associated with a first downlink (DL) transmission is greater than a threshold time. The apparatus may further be configured to disable, based on the at least one characteristic time with the first DL transmission being greater than the threshold time, a retransmission capability.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a flowchart of a method of wireless communication.

FIG. 10 is a flowchart of a method of wireless communication.

DETAILED DESCRIPTION

Figure 1:
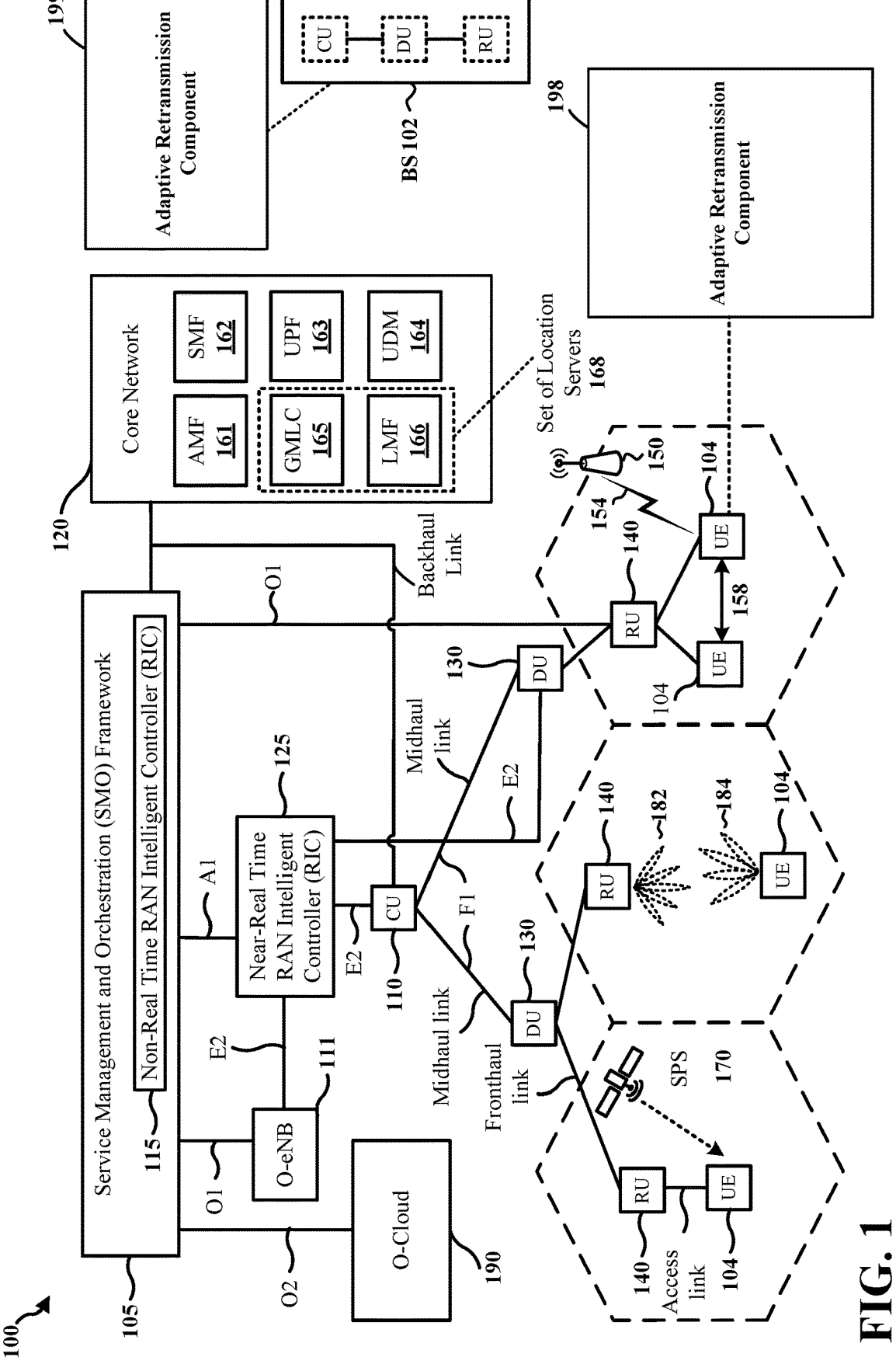
FIG. 1 is a diagram illustrating an example of a wireless communications system and an access network.

In some aspects of wireless communication, e.g., extender reality (XR) in 5G NR, some transmissions have very short periodicity and/or a tight delay requirement may render multiple retransmission impractical. For example, some XR flows on UL, such as pose, may have very short periodicity (e.g., approximately 4 ms) and tight delay budget (e.g., approximately 10 ms), which makes it impractical to have multiple retransmissions. For such XR (or similar) flows, a UE may save power by disabling a retransmission based on an experienced packet delay (e.g., disabling retransmission when an experienced packet delay is greater than the delay budget). When retransmission is disabled, the UE may not initiate retransmission outside discontinuous reception (DRX) active time after a transmission via a configured grant (CG) to save UE power.

In some aspects, a base station may (e.g., by initiating a HARQ Mode B) disable retransmission by a UE for certain types of communication, e.g., non-terrestrial networks (NTNs), based on an expectation that a retransmission will occur after a delay budget associated with an initial transmission has expired. Other communication flows with tight delay budgets may also benefit from disabling retransmission (e.g., may conserver power when retransmission occurs after the expiration of a delay budget). However, a naïve extension of HARQ Mode B to other communication with tight delay budgets may reduce a successful packet decoding rate unnecessarily if conditions are sufficient to meet the tight delay budget. Accordingly, a method and apparatus are provided for a UE to adaptively disable and/or enable retransmission based on an experienced packet delay at the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include adaptive retransmission component 198 that may be configured to identify that at least one characteristic time associated with a first UL transmission is greater than a threshold time. The adaptive retransmission component 198, may further be configured to disable, based on the at least one characteristic time with the first UL transmission being greater than the threshold time, a retransmission capability. In certain aspects, the base station 102 may include an adaptive retransmission component 199 that may be configured to identify that at least one characteristic time associated with a first DL transmission is greater than a threshold time. The adaptive retransmission component 199 may further be configured to disable, based on the at least one characteristic time with the first DL transmission being greater than the threshold time, a retransmission capability. Although the following description may be focused on 5G NR, the concepts described herein may be applicable to other similar areas, such as LTE, LTE-A, CDMA, GSM, and other wireless technologies.

Figures 2A, 2B, 2C, 2D:
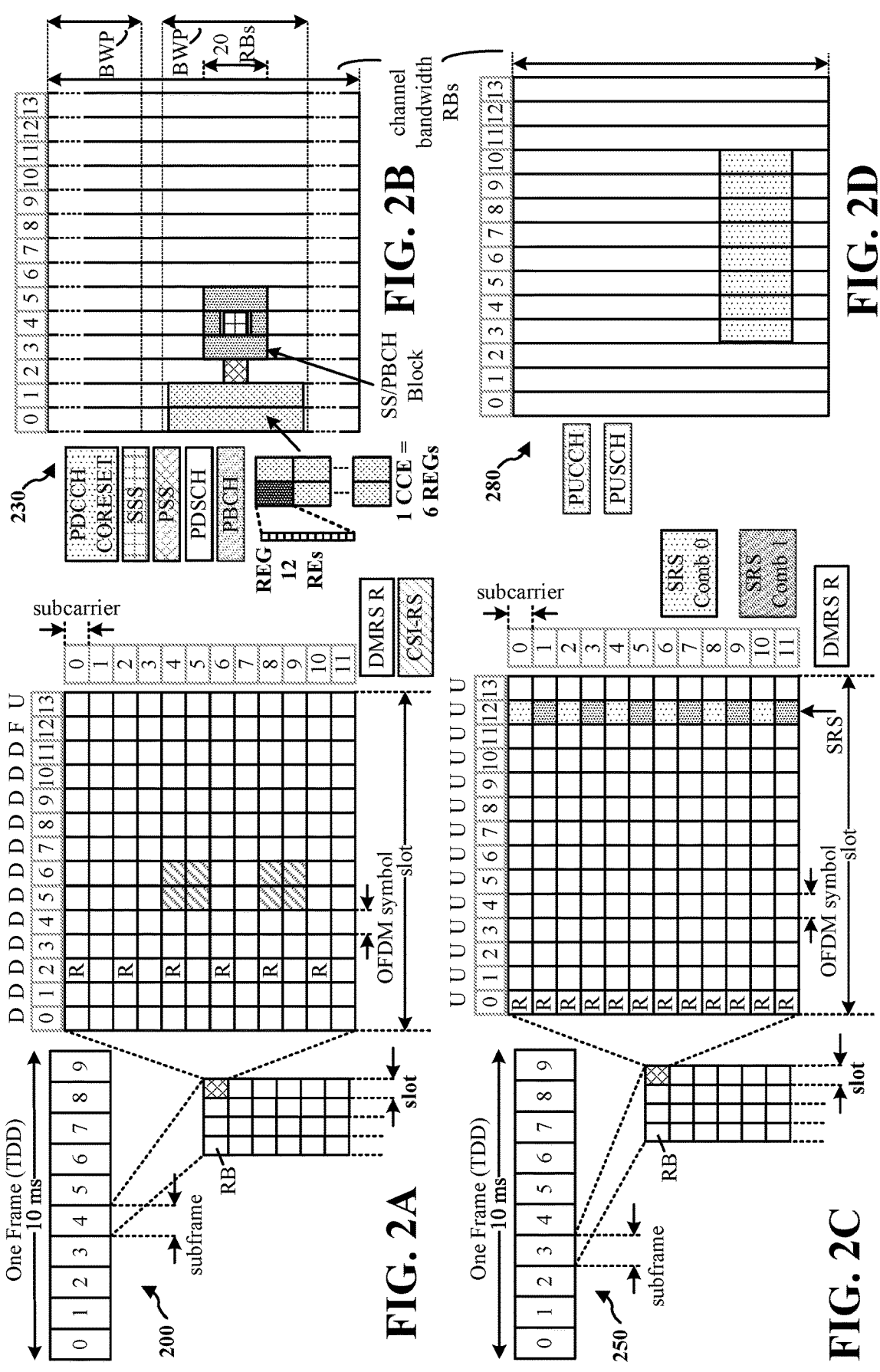
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
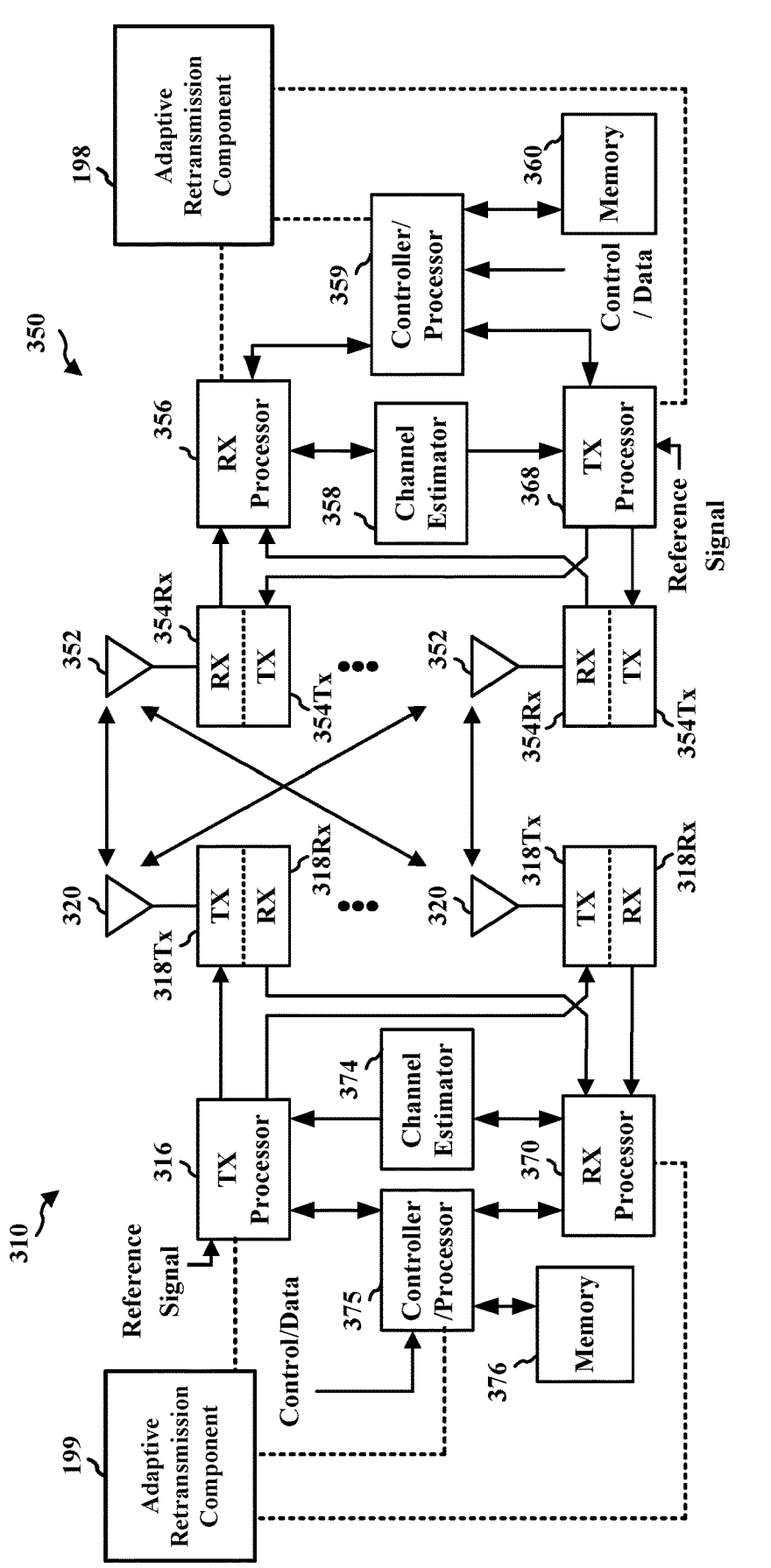
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the adaptive retransmission component 198 of FIG. 1.

At least one of the TX processor 316, the RX processor 370, and the controller/processor 375 may be configured to perform aspects in connection with the adaptive retransmission component 199 of FIG. 1.

In some aspects of wireless communication, e.g., XR in 5G NR, some transmissions have very short periodicity and/or a tight delay requirement may render multiple retransmission impractical. For example, some XR flows on UL, such as pose, may have very short periodicity (e.g., approximately 4 ms) and tight delay budget (e.g., approximately 10 ms), which makes it impractical to have multiple retransmissions. For such XR (or similar) flows, a UE may save power by disabling a retransmission based on an experienced packet delay (e.g., disabling retransmission when an experienced packet delay is greater than the delay budget). When retransmission is disabled, the UE may not initiate retransmission outside DRX active time after a transmission via a CG to save UE power.

In some aspects, a base station may (e.g., by initiating a HARQ Mode B) disable retransmission by a UE for certain types of communication, e.g., NTNs, based on an expectation that a retransmission will occur after a delay budget associated with an initial transmission has expired. Other communication flows with tight delay budgets may also benefit from disabling retransmission (e.g., may conserver power when retransmission occurs after the expiration of a delay budget). However, a naïve extension of HARQ Mode B to other communication with tight delay budgets may reduce a successful packet decoding rate unnecessarily if conditions are sufficient to meet the tight delay budget. Accordingly, a method and apparatus are provided for a UE to adaptively disable and/or enable retransmission based on an experienced packet delay at the UE to provide the benefits of retransmission where delay budgets are currently being met while avoiding the overhead associated with retransmission where delay budgets are not currently being met.

Figure 4:
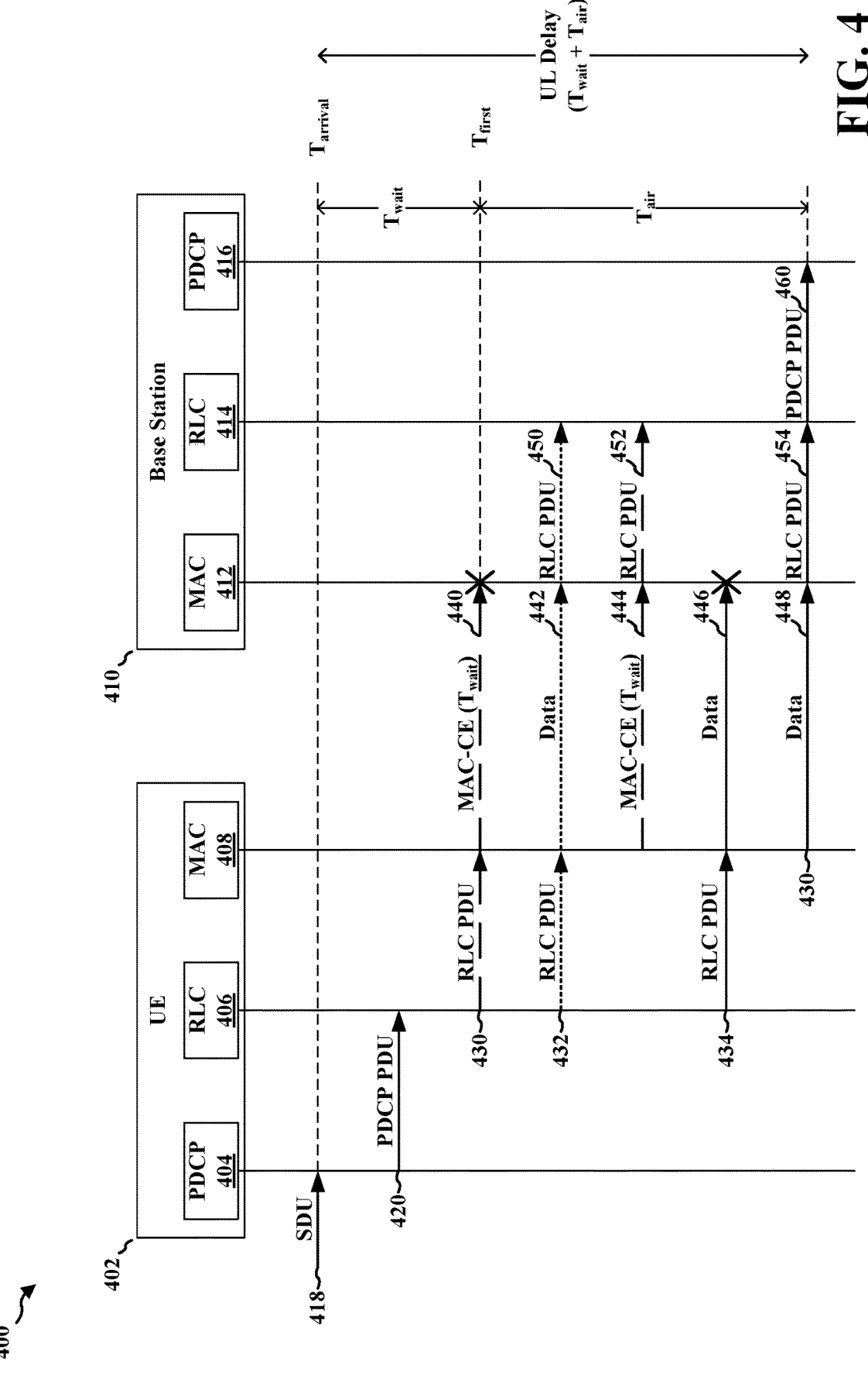
FIG. 4 is a diagram illustrating a timeline for transmitting data from a first device to a second device.

FIG. 4 is a diagram 400 illustrating a timeline for transmitting data from a first device (e.g., a UE 402) to a second device (e.g., a base station 410). Each of the first device and the second device may be associated with a protocol stack including a PDCP layer (e.g., PDCP layer 404 or PDCP layer 416), a RLC layer (e.g., RLC layer 406 or RLC layer 414), and a MAC layer (e.g., MAC layer 408 or MAC layer 412). Data processing associated with a data transmission from the UE 402 to the base station 410 may include receiving a SDU 418 for PDCP layer processing at a first time (e.g., $T_{arrival}$). The SDU 418, in some aspects, may represent multiple SDUs associated with multiple logical channels provided for PDCP layer processing at different times. The SDU 418 may be processed by the PDCP layer 404 to produce a PDCP PDU 420, the PDCP PDU 420 may be provided to a RLC layer 406 for RLC layer processing to produce one or more RLC PDUs (e.g., RLC PDU 430, RLC PDU 432, and RLC PDU 434). The RLC PDUs 430-434 may be provided to a MAC layer 408 to be processed into a set of MAC layer transmissions (e.g., a set of transmissions associated with a MAC PDU or TB) that may include a MAC-CE (e.g., a MAC-CE 440 or re-transmitted MAC-CE 444), data 442, data 446, and data 448 for transmission to the base station 410.

A transmission of the MAC PDU may begin at a second time ($T_{first}$) that follows the first time ($T_{arrival}$) by a first time period ($T_{wait}$). The first time period may be an uplink queueing delay or a delay from packet arrival at a PDCP upper service access point (SAP), e.g., PDCP layer 404, until the UL grant to transmit the packet is available. The first time period, in some aspects, may be a first time period for a particular logical channel, with different logical channels having first time periods ($T_{wait\_logicalChannel}$) of different durations. In some aspects, the first time period may include a delay associated with a resource grant for the associated UL transmission (e.g., a delay including a time from sending a service request (SR) or RACH transmission associated with a first resource grant). The transmission of the MAC PDU may include a transmission of a MAC-CE 440, data 442, and data 446, where one or more of the transmissions may fail and result in a re-transmission of a failed transmission, e.g., MAC-CE 444 and data 448 may be re-transmissions of failed transmissions of MAC-CE 440 and data 446. At the base station 410, the MAC layer 412 may process the received transmissions to provide RLC PDUs to the RLC layer 414 (e.g., RLC PDU 450, RLC PDU 452, and RLC PDU 454). And the RLC PDUs 450-454 may be used to reproduce a PDCP PDU 460 to provide to the PDCP layer 416. The time for the successful transmission of the MAC PDU, e.g., $T_{air}$, may then be identified by the base station 410 and/or the UE 402 and a total UL delay (from receiving the SDU 418 at the PDCP layer 404 until a completed transmission of one of the MAC PDU or until the PDCP PDU is provided to the PDCP layer) may be identified and/or determined by the UE.

The base station 410, in some aspects, may not be aware of the duration of the first time period, $T_{wait}$. Accordingly, the base station 410 may not have information to make an optimal determination as to whether to disable or enable retransmissions. For example, if $T_{air}$ is below a threshold value, but the total UL delay including the $T_{wait}$ and the $T_{air}$ is above a threshold value, the base station 410 may enable retransmission despite the retransmission taking longer than a threshold time for usefulness. The threshold time for usefulness, in some aspects, may be based on a periodicity of transmissions for a same type of data representing a current state of the UE such that more recent data replaces and/or renders moot past data.

Figure 5:
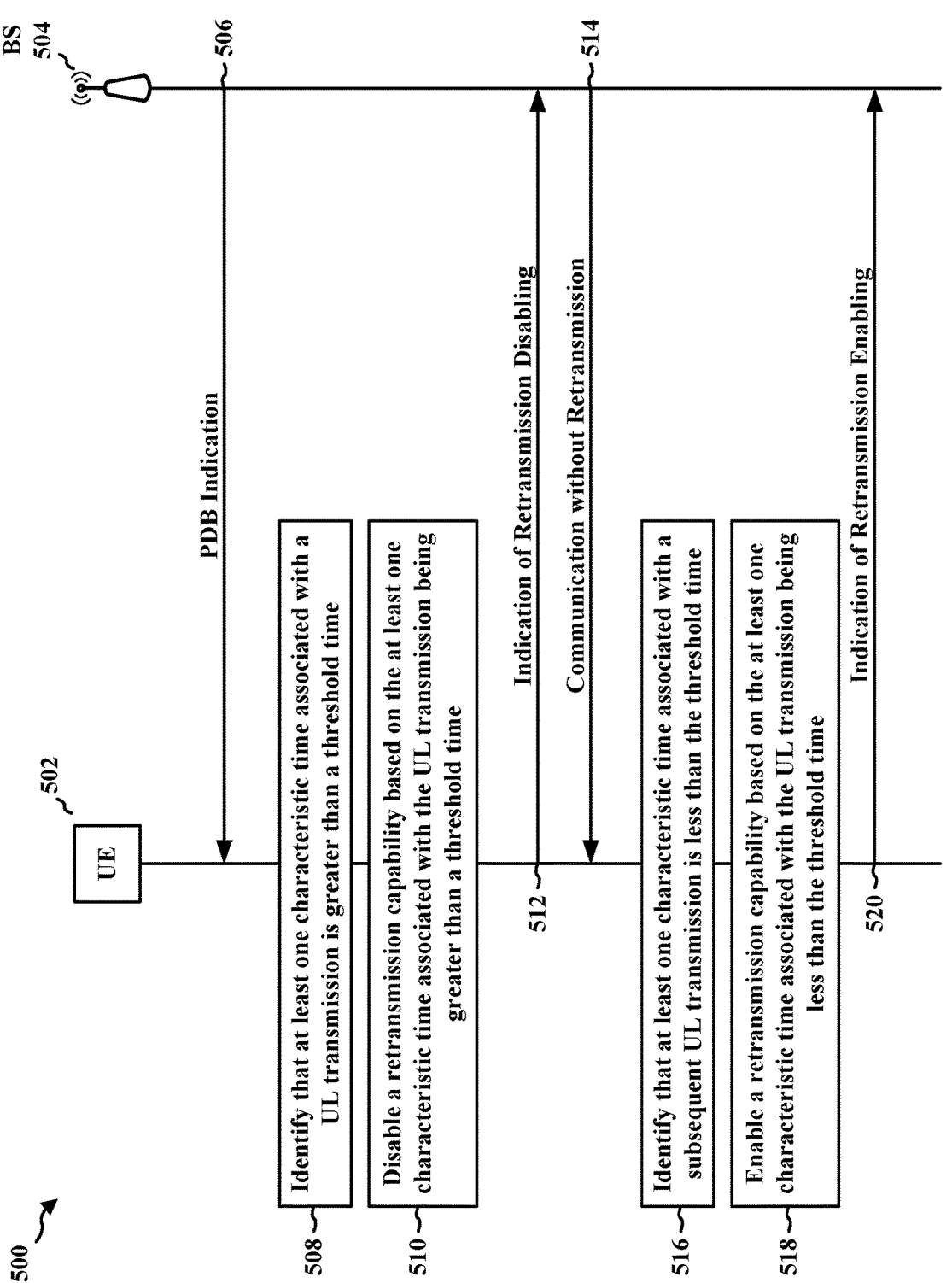
FIG. 5 is a call flow diagram illustrating a method of wireless communication in accordance with some aspects of the disclosure.

FIG. 5 is a call flow diagram 500 illustrating a method of wireless communication in accordance with some aspects of the disclosure. Diagram 500 illustrates a UE 502 in communication with a base station 504. The base station 504 may transmit, and the UE 502 may receive, a packet delay budget (PDB) indication 506. The PDB indication 506, in some aspects, may indicate a first threshold time or PDB associated with an UL transmission, e.g., a time after an UL transmission begins, or data for the UL transmission is generated, by which a data transmission should be successfully completed. In some aspects, the PDB indication 506 may include one or more of a value of the threshold time or the PDB associated with a first UL transmission used to derive a related, second threshold time at the UE. The first threshold time and/or the second threshold time, in some aspects, may be a threshold time used to determine whether retransmission is expected to complete before the UL transmission is obsolete, out-of-date, or pre-empted by a subsequent UL transmission. The PDB indication 506, in some aspects, may include a threshold time for each of a plurality of logical channels associated with one or more UL transmissions.

At 508, the UE 502 may identify that at least one time period associated with a first UL transmission is greater than a threshold time. In some aspects, the at least one time period associated with the first UL transmission is one or more of an uplink queuing delay or a time elapsed from an initial transmission of the first UL transmission (e.g., such that a time remaining in a PDB indicated in the PDB indication 506 is below a threshold time). The uplink queueing delay, in some aspects, may include a delay from packet arrival at a PDCP upper SAP until the UL grant to transmit the packet is available. In some aspects, the uplink queueing delay may include a delay associated with receiving an indication of a resource grant from a transmission of a SR or RACH transmission). In some aspects, the UE 502 may identify for each of a plurality of logical channels whether the at least one time period for that logical channel is greater than a threshold time for that logical channel. In some aspects, the identification at 508 may be based on an average value for the at least one time period over a known or configured number of UL transmission occasions associated with the first UL transmission. The average, in some aspects, may be a moving average or a weighted moving average that gives more weight to more recent occasions.

Based on identifying, at 508, that the at least one time period associated with the first UL transmission being greater than the threshold time, the UE 502 may disable, at 510, a retransmission capability of the UE for the UL transmissions associated with the first UL transmission. In some aspects, the UE 502 may disable a retransmission capability of the UE associated with one or more logical channels based on the at least one time period for that logical channel being greater than a threshold time for that logical channel. The UE 502 may disable the retransmission capability without receiving an explicit instruction, or indication, from the base station 504 to disable the retransmission. In some aspects, the UE 502 is configured to determine to disable or enable the retransmission capability because the UE 502 has information that is not available at the base station 504.

In some aspects, the UE 502 may transmit, and base station 504 may receive, an indication 512 that the retransmission capability of the UE has been disabled. The indication, in some aspects, may be transmitted via one of UCI or a MAC-CE. In some aspects, the indication 512 may be transmitted via the MAC-CE and the MAC-CE may be associated with a different HARQ process (e.g., for a configuration capable of 16 parallel HARQ processes). The different HARQ process, in some aspects, may be associated with a second carrier where a first carrier is associated with the first UL transmission and the disabled retransmission capability. The indication 512 transmitted via a HARQ transmission of the different HARQ process, in some aspects, indicates the first carrier associated with the first UL transmission and the disabled retransmission capability of the UE. In some aspects, the indication 512 may be transmitted via the MAC-CE and the indication 512 may include a first indication that the retransmission capability of the UE has been disabled for a plurality of potential retransmissions.

Transmitting the indication 512, in some aspects, may be via a sequence associated with a DMRS associated with the first UL transmission. For example, the UE 502 may transmit a DMRS with a first sequence associated with retransmissions for a retransmitted second UL transmission and a second DMRS with a second sequence associated with initial transmissions for the first UL transmission. In some aspects, the indication 512 may be via a scrambling associated with the first UL transmission. For example, a retransmitted second UL transmission may be transmitted using a first scrambling and the first UL transmission may be transmitted using a second scrambling. Based on the indication 512, the base station may not perform a blind decoding for a possible retransmission as it is made aware of the retransmission capability of the UE 502 being disabled. In the absence of the indication 512, the base station 504 may perform a blind decoding associated with a possible retransmission.

In some aspects, the indication 512, nay indicate a time in the future at which the retransmission capability of the UE is scheduled to be disabled. The time may be indicated as a number of symbols, slots, or frames from the indication 512 or from some other reference time. The indication 512 may further indicate a duration of the disabling or that the retransmission capability may be disabled until a next indication (e.g., an enabling indication).

The base station 504 may transmit, and UE 502 may receive, communication 514 without retransmission. The communication 514, in some aspects, may include a flipped new data indicator associated with each potential retransmission in the plurality of retransmissions to indicate that the transmission is an initial transmission instead of a retransmission. In some aspects, the plurality of potential retransmissions may be associated with a plurality of HARQ processes.

At a later time, the UE 502 may identify, at 516, that the at least one time period associated with a subsequent UL transmission is less than the threshold time. As above, the identification may be performed, at 516, for a plurality of logical channels independently. The UE 502, may, at 518, enable the retransmission capability of the UE based on the at least one time period associated with the subsequent UL transmission being less than the threshold time. In some aspects, the UE 502 may enable a retransmission capability of the UE associated with one or more logical channels based on the at least one time period for that logical channel being less than a threshold time for that logical channel. The UE 502 may enable the retransmission capability without receiving an explicit instruction, or indication, from the base station 504 to enable the retransmission. In some aspects, the UE 502 is configured to determine to disable or enable the retransmission capability because the UE 502 has information (e.g., the uplink queueing delay) that is not available at the base station 504.

In some aspects, the UE 502 may transmit, and base station 504 may receive, an indication 520 that the retransmission capability of the UE has been enabled. The indication, in some aspects, may be transmitted via one of UCI or a MAC-CE. In some aspects, the indication 520 may be transmitted via the MAC-CE and the MAC-CE may be associated with a different HARQ process (e.g., for a configuration capable of 16 parallel HARQ processes). The different HARQ process, in some aspects, may be associated with a second carrier where a first carrier is associated with the first UL transmission and the enabled retransmission capability. The indication 520 transmitted via a HARQ transmission of the different HARQ process, in some aspects, indicates the first carrier associated with the first UL transmission and the enabled retransmission capability of the UE. In some aspects, the indication 520 may be transmitted via the MAC-CE and the indication 520 may include a first indication that the retransmission capability of the UE has been enabled for a plurality of potential retransmissions.

Transmitting the indication 520, in some aspects, may be via a sequence associated with a DMRS associated with the first UL transmission as discussed above in relation to indication 512. In some aspects, the indication 520 may be via a scrambling associated with the subsequent UL transmission as discussed above in relation to indication 512.

Figure 6:
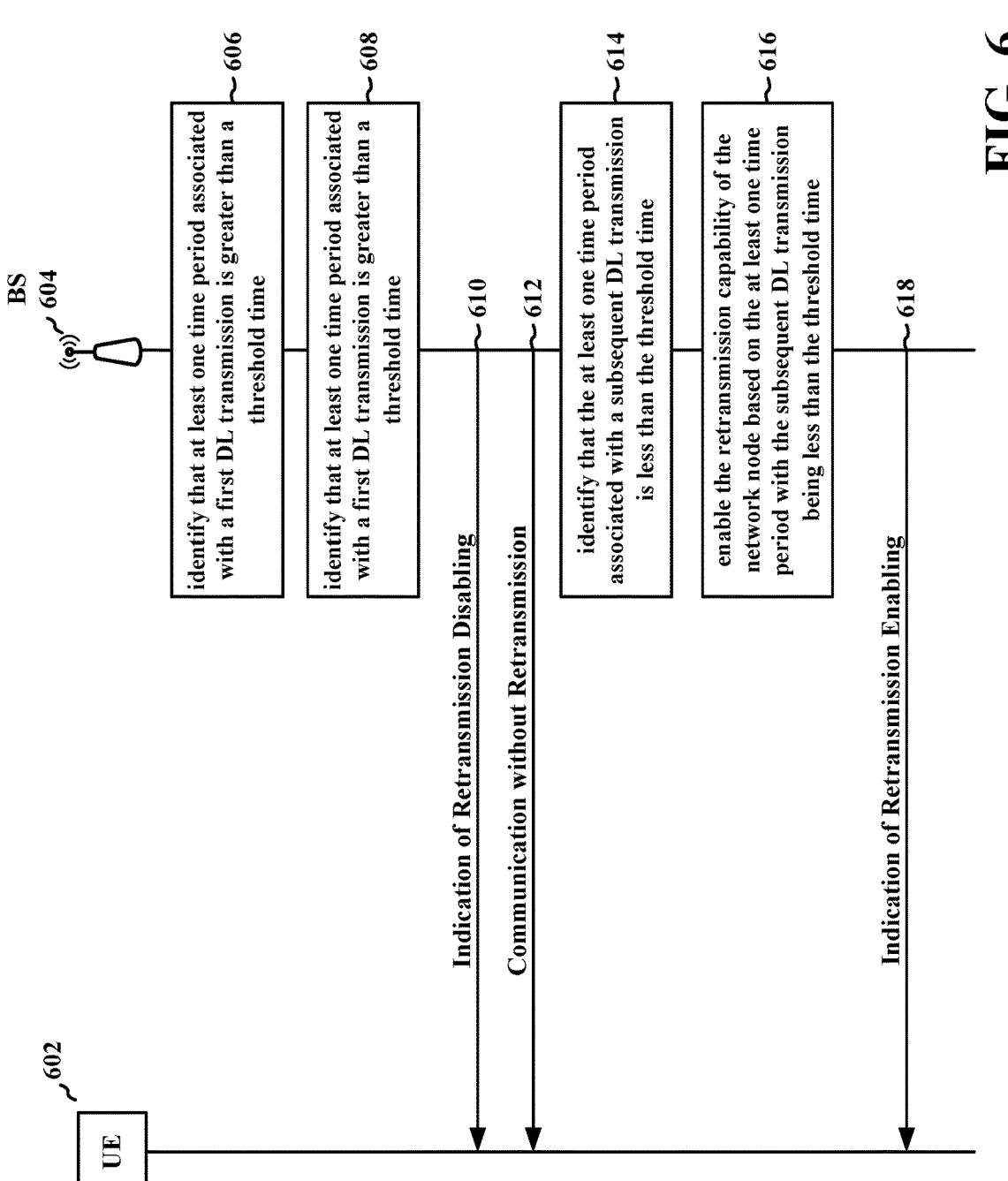
FIG. 6 is a call flow diagram illustrating a method of wireless communication in accordance with some aspects of the disclosure.

FIG. 6 is a call flow diagram 600 illustrating a method of wireless communication in accordance with some aspects of the disclosure. Diagram 600 illustrates a UE 602 in communication with a base station 604. The base station 604 may determine a PDB associated with a first DL transmission or a group of DL transmissions included in a DL flow. The PDB, in some aspects, may be associated with a first threshold time associated with the first DL, e.g., a time after the first DL transmission begins, or data for the first DL transmission is generated, by which a data transmission should be successfully completed. In some aspects, the PDB or threshold time may include one or more of a value of the threshold time or the PDB for the first DL transmission used to derive a related, second threshold time. The first threshold time and/or the second threshold time, in some aspects, may be a threshold time used to determine whether retransmission is expected to complete before the first DL transmission is obsolete, out-of-date, or pre-empted by a subsequent DL transmission. The base station may, in some aspects, determine a threshold time for each of a plurality of logical channels associated with one or more DL transmissions.

At 606, the base station 604 may identify that at least one time period associated with a first DL transmission is greater than a threshold time. In some aspects, the at least one time period associated with the first DL transmission is one or more of an DL queueing delay or a time elapsed from an initial transmission of the first DL transmission (e.g., such that a time remaining in a PDB indicated in the PDB indication 606 is below a threshold time). The DL queueing delay, in some aspects, may include a delay from packet arrival at a PDCP upper SAP until the DL transmission is scheduled. In some aspects, the base station 604 may identify for each of a plurality of logical channels whether the at least one time period for that logical channel is greater than a threshold time for that logical channel. In some aspects, the identification at 606 may be based on an average value for the at least one time period over a known or configured number of UL transmission occasions associated with the first UL transmission. The average, in some aspects, may be a moving average or a weighted moving average that gives more weight to more recent occasions.

Based on identifying, at 606, that the at least one time period associated with the first DL transmission being greater than the threshold time, the base station 604 may disable, at 608, a retransmission capability of the base station 604 for the DL transmissions associated with the first DL transmission. In some aspects, the base station 604 may disable a retransmission capability of the base station 604 associated with one or more logical channels based on the at least one time period for that logical channel being greater than a threshold time for that logical channel. In some aspects, the base station 604 is configured to determine to disable or enable the retransmission capability dynamically based on conditions at the network node that may change over time.

In some aspects, the base station 604 may transmit, and UE 602 may receive, an indication 610 that the retransmission capability of the base station 604 has been disabled. The indication, in some aspects, may be transmitted via one of DCI or a MAC-CE. In some aspects, the indication 610 may be transmitted via the MAC-CE and the MAC-CE may be associated with a different HARQ process (e.g., for a configuration capable of 16 parallel HARQ processes). The different HARQ process, in some aspects, may be associated with a second carrier where a first carrier is associated with the first DL transmission and the disabled retransmission capability. The indication 610 transmitted via a HARQ transmission of the different HARQ process, in some aspects, indicates the first carrier associated with the first DL transmission and the disabled retransmission capability of the base station 604. In some aspects, the indication 610 may be transmitted via the MAC-CE and the indication 610 may include a first indication that the retransmission capability of the base station 604 has been disabled for a plurality of potential retransmissions.

Transmitting the indication 610, in some aspects, may be via a sequence associated with a DMRS associated with the first DL transmission. For example, the base station 604 may transmit a DMRS with a first sequence associated with retransmissions for a retransmitted second DL transmission and a second DMRS with a second sequence associated with initial transmissions for the first DL transmission. In some aspects, the indication 610 may be via a scrambling associated with the first DL transmission. For example, a retransmitted second DL transmission may be transmitted using a first scrambling and the first DL transmission may be transmitted using a second scrambling. Based on the indication 610, the UE 602 may not perform a blind decoding for a possible retransmission as it is made aware of the retransmission capability of the base station 604 being disabled. In the absence of the indication 610, the UE 602 may perform a blind decoding associated with a possible retransmission.

In some aspects, the indication 610, nay indicate a time in the future at which the retransmission capability of the base station 604 is scheduled to be disabled. The time may be indicated as a number of symbols, slots, or frames from the indication 610 or from some other reference time. The indication 610 may further indicate a duration of the disabling or that the retransmission capability may be disabled until a next indication (e.g., an enabling indication).

The base station 604 may transmit, and UE 602 may receive, communication 612 without retransmission. The communication 612, in some aspects, may include a flipped new data indicator associated with each potential retransmission in the plurality of retransmissions to indicate that the transmission is an initial transmission instead of a retransmission. In some aspects, the plurality of potential retransmissions may be associated with a plurality of HARQ processes.

At a later time, the base station 604 may identify, at 614, that the at least one time period associated with a subsequent DL transmission is less than the threshold time. As above, the identification may be performed, at 614, for a plurality of logical channels independently. The base station 604, may, at 616, enable the retransmission capability of the base station 604 based on the at least one time period associated with the subsequent DL transmission being less than the threshold time. In some aspects, the base station 604 may enable a retransmission capability of the base station 604 associated with one or more logical channels based on the at least one time period for that logical channel being less than a threshold time for that logical channel.

In some aspects, the base station 604 may transmit, and UE 602 may receive, an indication 618 that the retransmission capability of the base station 604 has been enabled. The indication, in some aspects, may be transmitted via one of UCI or a MAC-CE. In some aspects, the indication 618 may be transmitted via the MAC-CE and the MAC-CE may be associated with a different HARQ process (e.g., for a configuration capable of 16 parallel HARQ processes). The different HARQ process, in some aspects, may be associated with a second carrier where a first carrier is associated with the first DL transmission and the enabled retransmission capability. The indication 618 transmitted via a HARQ transmission of the different HARQ process, in some aspects, indicates the first carrier associated with the first DL transmission and the enabled retransmission capability of the base station 604. In some aspects, the indication 618 may be transmitted via the MAC-CE and the indication 618 may include a first indication that the retransmission capability of the base station 604 has been enabled for a plurality of potential retransmissions.

Transmitting the indication 618, in some aspects, may be via a sequence associated with a DMRS associated with the first DL transmission as discussed above in relation to indication 610. In some aspects, the indication 618 may be via a scrambling associated with the subsequent DL transmission as discussed above in relation to indication 610.

Figure 7:
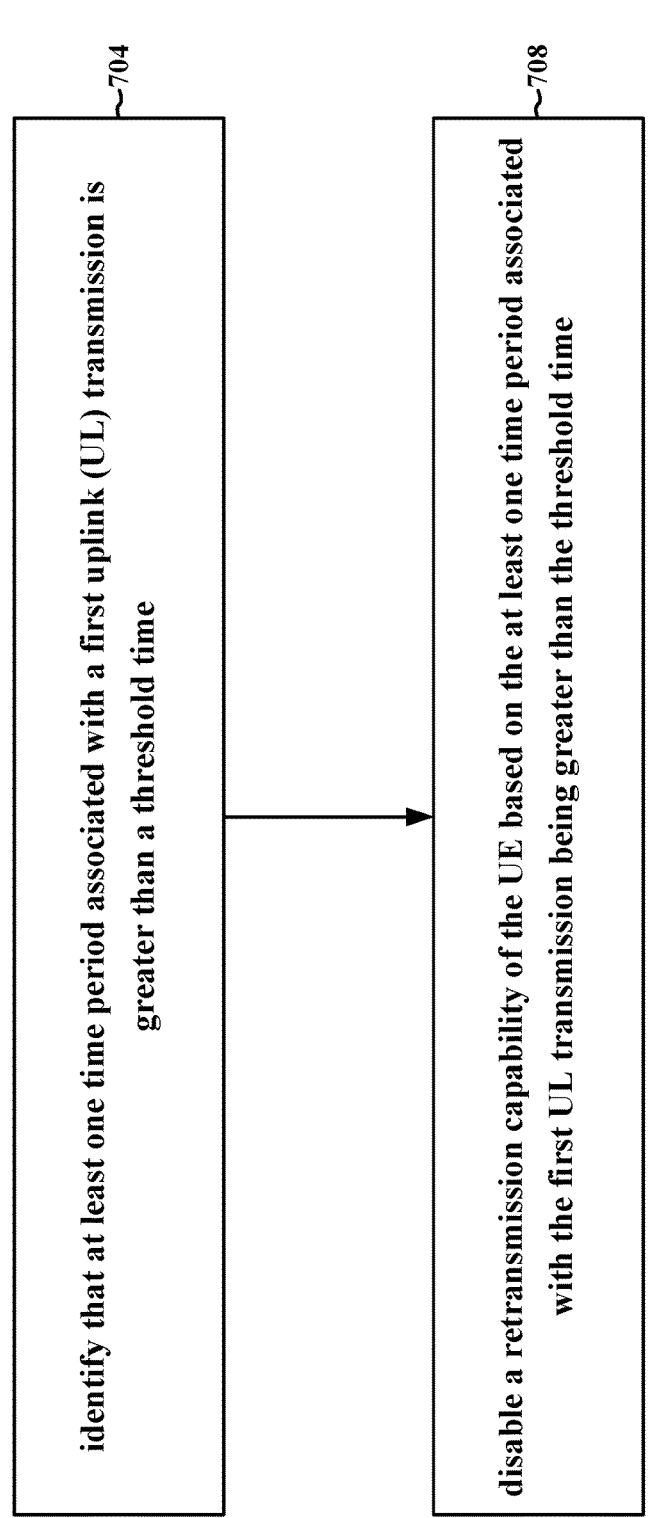
FIG. 7 is a flowchart of a method of wireless communication.

FIG. 7 is a flowchart 700 of a method of wireless communication. The method may be performed by a wireless device or UE, (e.g., the UE 104, 402, 502, and/or 602; the apparatus 1104). The UE may receive, from a network node, an indication of a threshold time. In some aspects, the indication comprises one or more of a value of the threshold time or a PDB associated with a first UL transmission used to derive the threshold time at the wireless device. For example, referring to FIG. 5, the UE 502 may receive, and base station 504 may transmit, PDB indication 506.

At 704, the UE may identify that at least one time period associated with a first UL transmission is greater than a threshold time. For example, 704 may be performed by application processor 1106 and/or adaptive retransmission component 198 of FIG. 11. The at least one time period associated with the first UL transmission, in some aspects, may be one or more of an uplink queuing delay or a time elapsed from an initial transmission of the first UL transmission. In some aspects, the first UL transmission includes data from a plurality of logical channels with each channel being associated with a corresponding threshold time in a plurality of threshold times. In some aspects, identifying, at 704, that at least one time period associated with a first UL transmission is greater than a threshold time includes identifying that the at least one time period associated with at least one logical channel in the plurality of logical channels is greater than a corresponding time in the corresponding plurality of threshold times. For example, referring to FIG. 5, the UE 502 may, at 508, identify that at least one time period associated with a first UL transmission is greater than a threshold time.

The UE may transmit, for a network node (e.g., a base station) that is a destination of the first UL transmission, an indication that the retransmission capability of the wireless device has been, or is scheduled to be, disabled. In some aspects, the indication may be transmitted via one of UCI or a MAC-CE. The indication, in some aspects, may be transmitted via the MAC-CE and the MAC-CE may be transmitted via one of another HARQ transmission or a second carrier other than a first carrier associated with the first UL transmission. A MAC-CE transmitted via the second carrier, in some aspects, may indicates the first carrier associated with the first UL transmission as the carrier for which the retransmission capability is being, or has been, disabled. In some aspects, an indication transmitted via a MAC-CE may include a first indication that the retransmission capability of the wireless device has been disabled for a plurality of potential retransmissions (e.g., transmissions for which a retransmission would be performed absent the disabling of the retransmission capability of the UE). The plurality of potential retransmission, in some aspects, may be indicated based on an indication that retransmission has been canceled until a subsequent indication enabling the retransmission capability or based on a starting frame, slot, or symbol and one of duration or an ending frame slot, or symbol. For example, referring to FIG. 5, the UE 502 may transmit indication 512 to the base station 504 indicating that the retransmission capability of the UE is disabled.

In some aspects, the indication may be transmitted via a sequence associated with a DMRS related to the first UL transmission or via a scrambling used for a UL transmission related to the first UL transmission. For example, the UE may, in some aspects, transmit a first DMRS with a first sequence associated with retransmissions for a retransmitted second UL transmission and a second DMRS with a second sequence associated with initial transmissions for the first UL transmission. In some aspects, a retransmitted second UL transmission may be transmitted using a first scrambling and the first UL transmission (or a related subsequent UL transmission) may be transmitted using a second scrambling indicating that there is no retransmission.

At 708, the UE may disable a retransmission capability of the UE based on the at least one time period associated with the first UL transmission being greater than the threshold time. For example, 708 may be performed by application processor 1106 and/or adaptive retransmission component 198 of FIG. 11. In some aspects, the retransmission capability of the UE may be disabled without additional input from the base station based on information (e.g., an uplink queueing time) available at the UE that is not available at the base station. For example, referring to FIG. 5 the UE 502 may disable, at 510, a retransmission capability of the UE for at least one UL transmission associated with the first UL transmission. In some aspects, based on disabling the retransmission capability of the UE, the UE may refrain from attempting to decode (or monitoring for) feedback regarding the UL transmissions for which retransmission has been disabled. Additionally, the base may refrain from sending the HARQ feedback and monitoring for retransmitted data.

Based on disabling the retransmission capability of the UE, the UE may receive a flipped new data indicator associated with each potential retransmission in the plurality of potential retransmissions, in some aspects, where a flipped indicator indicates that the associated transmission includes new data and is not a retransmission). The plurality of potential retransmissions, in some aspects, may be associated with a plurality of HARQ processes. For example, referring to FIG. 5, the UE 502 may receive communication 514 including the flipped new data indicator for each potential retransmission in the plurality of potential retransmissions.

At a subsequent time, the UE may identify that the at least one time period associated with a subsequent UL transmission is less than the threshold time. As above, the identification may be performed for a plurality of logical channels independently. For example, referring to FIG. 5, the UE 502 may identify, at 516, that the at least one time period associated with a subsequent UL transmission is less than the threshold time. The UE may then enable the retransmission capability of the UE based on the at least one time period associated with the subsequent UL transmission being less than the threshold time. In some aspects, the UE may enable a retransmission capability of the UE associated with one or more logical channels based on the at least one time period for that logical channel being less than a threshold time for that logical channel. The UE may enable the retransmission capability without receiving an explicit instruction, or indication, from a base station to enable the retransmission. In some aspects, the UE is configured to determine to disable or enable the retransmission capability because the UE has information (e.g., the uplink queuing delay) that is not available at the base station. For example, referring to FIG. 5, the UE 502 may, at 518, enable the retransmission capability of the UE based on the at least one time period associated with the subsequent UL transmission being less than the threshold time. As discussed in relation to transmitting the indication of disabling the retransmission capability, the UE may transmit an indication that the retransmission capability has been enabled. While presented in a particular order above, the operations associated with disabling and enabling a retransmission capability of the UE may be performed in other orders and may include additional operations (e.g., additional operations associated with enabling and disabling a retransmission capability for additional carriers or logical channels).

FIG. 8 is a flowchart 800 of a method of wireless communication. The method may be performed by a wireless device or UE, (e.g., the UE 104, 402, 502, and/or 602; the apparatus 1104). At 802, the UE may receive, from a network node, an indication of a threshold time. For example, 802 may be performed by application processor 1106, cellular baseband processor 1124, transceiver(s) 1122, antenna(s) 1180, and/or adaptive retransmission component 198 of FIG. 11. In some aspects, the indication comprises one or more of a value of the threshold time or a PDB associated with a first UL transmission used to derive the threshold time at the wireless device. For example, referring to FIG. 5, the UE 502 may receive, and base station 504 may transmit, PDB indication 506.

At 804, the UE may identify that at least one time period associated with a first UL transmission is greater than a threshold time. For example, 804 may be performed by application processor 1106 and/or adaptive retransmission component 198 of FIG. 11. The at least one time period associated with the first UL transmission, in some aspects, may be one or more of an uplink queueing delay or a time elapsed from an initial transmission of the first UL transmission. In some aspects, the first UL transmission includes data from a plurality of logical channels with each channel being associated with a corresponding threshold time in a plurality of threshold times. In some aspects, identifying, at 804, that at least one time period associated with a first UL transmission is greater than a threshold time includes identifying that the at least one time period associated with at least one logical channel in the plurality of logical channels is greater than a corresponding time in the corresponding plurality of threshold times. For example, referring to FIG. 5, the UE 502 may, at 508, identify that at least one time period associated with a first UL transmission is greater than a threshold time.

At 806, the UE may transmit, for a network node that is a destination of the first UL transmission, an indication that the retransmission capability of the wireless device has been, or is scheduled to be, disabled. For example, 806 may be performed by application processor 1106, cellular baseband processor 1124, transceiver(s) 1122, antenna(s) 1180, and/or adaptive retransmission component 198 of FIG. 11. In some aspects, the indication may be transmitted via one of UCI or a MAC-CE. The indication, in some aspects, may be transmitted via the MAC-CE and the MAC-CE may be transmitted via one of another HARQ transmission or a second carrier other than a first carrier associated with the first UL transmission. A MAC-CE transmitted via the second carrier, in some aspects, may indicates the first carrier associated with the first UL transmission as the carrier for which the retransmission capability is being, or has been, disabled. In some aspects, an indication transmitted via a MAC-CE may include a first indication that the retransmission capability of the wireless device has been disabled for a plurality of potential retransmissions (e.g., transmissions for which a retransmission would be performed absent the disabling of the retransmission capability of the UE). The plurality of potential retransmission, in some aspects, may be indicated based on an indication that retransmission has been canceled until a subsequent indication enabling the retransmission capability or based on a starting frame, slot, or symbol and one of duration or an ending frame slot, or symbol. For example, referring to FIG. 5, the UE 502 may transmit indication 512 to the base station 504 indicating that the retransmission capability of the UE is disabled. In some aspects, the indication may be transmitted via a sequence associated with a DMRS related to the first UL transmission or via a scrambling used for a UL transmission related to the first UL transmission. For example, the UE may, in some aspects, transmit a first DMRS with a first sequence associated with retransmissions for a retransmitted second UL transmission and a second DMRS with a second sequence associated with initial transmissions for the first UL transmission. In some aspects, a retransmitted second UL transmission may be transmitted using a first scrambling and the first UL transmission (or a related subsequent UL transmission) may be transmitted using a second scrambling indicating that there is no retransmission.

At 808, the UE may disable a retransmission capability of the UE based on the at least one time period associated with the first UL transmission being greater than the threshold time. For example, 808 may be performed by application processor 1106 and/or adaptive retransmission component 198 of FIG. 11. In some aspects, the retransmission capability of the UE may be disabled without additional input from the base station based on information (e.g., an uplink queueing time) available at the UE that is not available at the base station. For example, referring to FIG. 5 the UE 502 may disable, at 510, a retransmission capability of the UE for at least one UL transmission associated with the first UL transmission. In some aspects, based on disabling the retransmission capability of the UE, the UE may refrain from attempting to decode (or monitoring for) feedback regarding the UL transmissions for which retransmission has been disabled. Additionally, the base may refrain from sending the HARQ feedback and monitoring for retransmitted data.

At 810, the UE may receive a flipped new data indicator associated with each potential retransmission in the plurality of potential retransmissions (e.g., where a flipped indicator indicates that the associated transmission includes new data and is not a retransmission). For example, 810 may be performed by application processor 1106, cellular baseband processor 1124, transceiver(s) 1122, antenna(s) 1180, and/or adaptive retransmission component 198 of FIG. 11. The plurality of potential retransmissions, in some aspects, may be associated with a plurality of HARQ processes. For example, referring to FIG. 5, the UE 502 may receive communication 514 including the flipped new data indicator for each potential retransmission in the plurality of potential retransmissions.

At 812, the UE may identify that the at least one time period associated with a subsequent UL transmission is less than the threshold time. For example, 812 may be performed by application processor 1106 and/or adaptive retransmission component 198 of FIG. 11. As above, the identification may be performed, at 812, for a plurality of logical channels independently. For example, referring to FIG. 5, the UE 502 may identify, at 516, that the at least one time period associated with a subsequent UL transmission is less than the threshold time.

Finally, at 814, the UE may enable the retransmission capability of the UE based on the at least one time period associated with the subsequent UL transmission being less than the threshold time. For example, 814 may be performed by application processor 1106 and/or adaptive retransmission component 198 of FIG. 11. In some aspects, the UE may enable a retransmission capability of the UE associated with one or more logical channels based on the at least one time period for that logical channel being less than a threshold time for that logical channel. The UE may enable the retransmission capability without receiving an explicit instruction, or indication, from a base station to enable the retransmission. In some aspects, the UE is configured to determine to disable or enable the retransmission capability because the UE has information (e.g., the uplink queuing delay) that is not available at the base station. For example, referring to FIG. 5, the UE 502 may, at 518, enable the retransmission capability of the UE based on the at least one time period associated with the subsequent UL transmission being less than the threshold time. As discussed in relation to transmitting the indication of disabling the retransmission capability at 806, the UE may transmit an indication that the retransmission capability has been enabled. While presented in a particular order above, the operations associated with disabling and enabling a retransmission capability of the UE may be performed in other orders and may include additional operations (e.g., additional operations associated with enabling and disabling a retransmission capability for additional carriers or logical channels).

Figure 9:
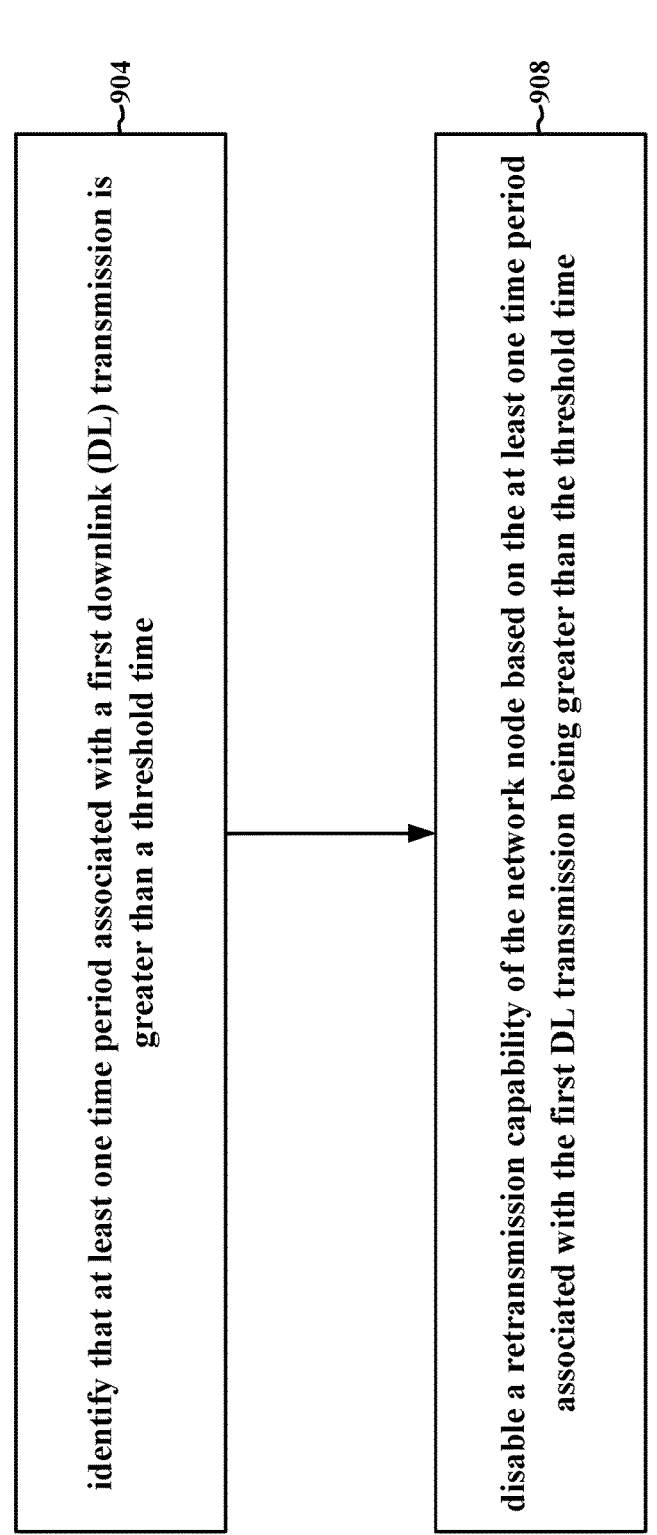
FIG. 9 is a flowchart of a method of wireless communication.

FIG. 9 is a flowchart 900 of a method of wireless communication. The method may be performed by a base station (e.g., the base station 102, 410, 504, and/or 604; the network entity 1202). At 904, the base station may identify that at least one time period associated with a first DL transmission is greater than a threshold time. For example, 904 may be performed by CU processor 1212, DU processor 1232, RU processor 1242, and/or adaptive retransmission component 199 of FIG. 12. The at least one time period associated with the first DL transmission, in some aspects, may be one or more of a DL queueing delay or a time elapsed from an initial transmission of the first DL transmission. In some aspects, the first DL transmission includes data from a plurality of logical channels with each channel being associated with a corresponding threshold time in a plurality of threshold times. In some aspects, identifying, at 904, that at least one time period associated with a first DL transmission is greater than a threshold time includes identifying that the at least one time period associated with at least one logical channel in the plurality of logical channels is greater than a corresponding time in the corresponding plurality of threshold times. For example, referring to FIG. 6, the base station 604 may, at 606, identify that at least one time period associated with a first DL transmission is greater than a threshold time.

Based on identifying that at least one time period associated with a first DL transmission is greater than a threshold time at 904, the base station may transmit, for a wireless device (e.g., a UE), an indication that the retransmission capability of the base station has been, or is scheduled to be, disabled. In some aspects, the indication may be transmitted via one of DCI or a MAC-CE. The indication, in some aspects, may be transmitted via the MAC-CE and the MAC-CE may be transmitted via one of another HARQ transmission or a second carrier other than a first carrier associated with the first DL transmission. A MAC-CE transmitted via the second carrier, in some aspects, may indicates the first carrier associated with the first DL transmission as the carrier for which the retransmission capability is being, or has been, disabled. In some aspects, an indication transmitted via a MAC-CE may include a first indication that the retransmission capability of the base station has been disabled for a plurality of potential retransmissions (e.g., transmissions for which a retransmission would be performed absent the disabling of the retransmission capability of the base station). The plurality of potential retransmission, in some aspects, may be indicated based on an indication that retransmission has been canceled until a subsequent indication enabling the retransmission capability or based on a starting frame, slot, or symbol and one of duration or an ending frame slot, or symbol. For example, referring to FIG. 6, the base station 604 may transmit indication 610 to the UE 602 indicating that the retransmission capability of the base station is disabled.

At 908, the base station may disable a retransmission capability of the base station based on the at least one time period associated with the first DL transmission being greater than the threshold time. For example, 908 may be performed by CU processor 1212, DU processor 1232, RU processor 1242, and/or adaptive retransmission component 199 of FIG. 12. For example, referring to FIG. 6 the base station 604 may disable, at 608, a retransmission capability of the base station for at least one DL transmission associated with the first DL transmission. In some aspects, based on disabling the retransmission capability of the base station, the base station may refrain from attempting to decode (or monitoring for) feedback regarding the DL transmissions for which retransmission has been disabled. Additionally, the UE may refrain from sending the HARQ feedback and monitoring for retransmitted data.

Based on disabling the retransmission capability at 908, the base station may transmit a flipped new data indicator associated with each potential retransmission in the plurality of potential retransmissions (e.g., where a flipped indicator indicates that the associated transmission includes new data and is not a retransmission). The plurality of potential retransmissions, in some aspects, may be associated with a plurality of HARQ processes. For example, referring to FIG. 6, the base station 604 may receive communication 612 including the flipped new data indicator for each potential retransmission in the plurality of potential retransmissions.

At 912, the base station may identify that the at least one time period associated with a subsequent DL transmission is less than the threshold time. As above, the identification may be performed, at 912, for a plurality of logical channels independently. For example, referring to FIG. 6, the base station 604 may identify, at 614, that the at least one time period associated with a subsequent DL transmission is less than the threshold time. The base station may then enable the retransmission capability of the base station based on the at least one time period associated with the subsequent DL transmission being less than the threshold time. In some aspects, the base station may enable a retransmission capability of the base station associated with one or more logical channels based on the at least one time period for that logical channel being less than a threshold time for that logical channel. For example, referring to FIG. 6, the base station 604 may, at 616, enable the retransmission capability of the base station based on the at least one time period associated with the subsequent DL transmission being less than the threshold time. As discussed in relation to transmitting the indication of disabling the retransmission capability, the base station may transmit an indication that the retransmission capability has been enabled. While presented in a particular order above, the operations associated with disabling and enabling a retransmission capability of the base station may be performed in other orders and may include additional operations (e.g., additional operations associated with enabling and disabling a retransmission capability for additional carriers or logical channels).

FIG. 10 is a flowchart 1000 of a method of wireless communication. The method may be performed by a base station (e.g., the base station 102, 410, 504, and/or 604; the network entity 1202). At 1002, the base station may transmit, to a UE, an indication of a threshold time. For example, 1002 may be performed by CU processor 1212, DU processor 1232, RU processor 1242, transceiver(s) 1246, antenna(s) 1280, and/or adaptive retransmission component 199 of FIG. 12. In some aspects, the indication comprises one or more of a value of the threshold time or a PDB associated with a first UL transmission used to derive the threshold time at the wireless device. For example, referring to FIG. 5, the UE 502 may receive, and base station 504 may transmit, PDB indication 506.

At 1004, the base station may identify that at least one time period associated with a first DL transmission is greater than a threshold time. For example, 1004 may be performed by CU processor 1212, DU processor 1232, RU processor 1242, and/or adaptive retransmission component 199 of FIG. 12. The at least one time period associated with the first DL transmission, in some aspects, may be one or more of a DL queueing delay or a time elapsed from an initial transmission of the first DL transmission. In some aspects, the first DL transmission includes data from a plurality of logical channels with each channel being associated with a corresponding threshold time in a plurality of threshold times. In some aspects, identifying, at 1004, that at least one time period associated with a first DL transmission is greater than a threshold time includes identifying that the at least one time period associated with at least one logical channel in the plurality of logical channels is greater than a corresponding time in the corresponding plurality of threshold times. For example, referring to FIG. 6, the base station 604 may, at 606, identify that at least one time period associated with a first DL transmission is greater than a threshold time.

At 1006, the base station may transmit, for a wireless device (e.g., a UE), an indication that the retransmission capability of the base station has been, or is scheduled to be, disabled. For example, 1006 may be performed by CU processor 1212, DU processor 1232, RU processor 1242, transceiver(s) 1246, antenna(s) 1280, and/or adaptive retransmission component 199 of FIG. 12. In some aspects, the indication may be transmitted via one of DCI or a MAC-CE. The indication, in some aspects, may be transmitted via the MAC-CE and the MAC-CE may be transmitted via one of another HARQ transmission or a second carrier other than a first carrier associated with the first DL transmission. A MAC-CE transmitted via the second carrier, in some aspects, may indicates the first carrier associated with the first DL transmission as the carrier for which the retransmission capability is being, or has been, disabled. In some aspects, an indication transmitted via a MAC-CE may include a first indication that the retransmission capability of the base station has been disabled for a plurality of potential retransmissions (e.g., transmissions for which a retransmission would be performed absent the disabling of the retransmission capability of the base station). The plurality of potential retransmission, in some aspects, may be indicated based on an indication that retransmission has been canceled until a subsequent indication enabling the retransmission capability or based on a starting frame, slot, or symbol and one of duration or an ending frame slot, or symbol. For example, referring to FIG. 6, the base station 604 may transmit indication 610 to the UE 602 indicating that the retransmission capability of the base station is disabled.

At 1008, the base station may disable a retransmission capability of the base station based on the at least one time period associated with the first DL transmission being greater than the threshold time. For example, 1008 may be performed by CU processor 1212, DU processor 1232, RU processor 1242, and/or adaptive retransmission component 199 of FIG. 12. For example, referring to FIG. 6 the base station 604 may disable, at 608, a retransmission capability of the base station for at least one DL transmission associated with the first DL transmission. In some aspects, based on disabling the retransmission capability of the base station, the base station may refrain from attempting to decode (or monitoring for) feedback regarding the DL transmissions for which retransmission has been disabled. Additionally, the UE may refrain from sending the HARQ feedback and monitoring for retransmitted data.

At 1010, the base station may transmit a flipped new data indicator associated with each potential retransmission in the plurality of potential retransmissions (e.g., where a flipped indicator indicates that the associated transmission includes new data and is not a retransmission). For example, 1010 may be performed by CU processor 1212, DU processor 1232, RU processor 1242, transceiver(s) 1246, antenna(s) 1280, and/or adaptive retransmission component 199 of FIG. 12. The plurality of potential retransmissions, in some aspects, may be associated with a plurality of HARQ processes. For example, referring to FIG. 6, the base station 604 may receive communication 612 including the flipped new data indicator for each potential retransmission in the plurality of potential retransmissions.

At 1012, the base station may identify that the at least one time period associated with a subsequent DL transmission is less than the threshold time. For example, 1012 may be performed by CU processor 1212, DU processor 1232, RU processor 1242, and/or adaptive retransmission component 199 of FIG. 12. As above, the identification may be performed, at 1012, for a plurality of logical channels independently. For example, referring to FIG. 6, the base station 604 may identify, at 614, that the at least one time period associated with a subsequent DL transmission is less than the threshold time.

Finally, at 1014, the base station may enable the retransmission capability of the base station based on the at least one time period associated with the subsequent DL transmission being less than the threshold time. For example, 1014 may be performed by CU processor 1212, DU processor 1232, RU processor 1242, and/or adaptive retransmission component 199 of FIG. 12. In some aspects, the base station may enable a retransmission capability of the base station associated with one or more logical channels based on the at least one time period for that logical channel being less than a threshold time for that logical channel. For example, referring to FIG. 6, the base station 604 may, at 616, enable the retransmission capability of the base station based on the at least one time period associated with the subsequent DL transmission being less than the threshold time. As discussed in relation to transmitting the indication of disabling the retransmission capability at 1006, the base station may transmit an indication that the retransmission capability has been enabled. While presented in a particular order above, the operations associated with disabling and enabling a retransmission capability of the base station may be performed in other orders and may include additional operations (e.g., additional operations associated with enabling and disabling a retransmission capability for additional carriers or logical channels).

Figure 11:
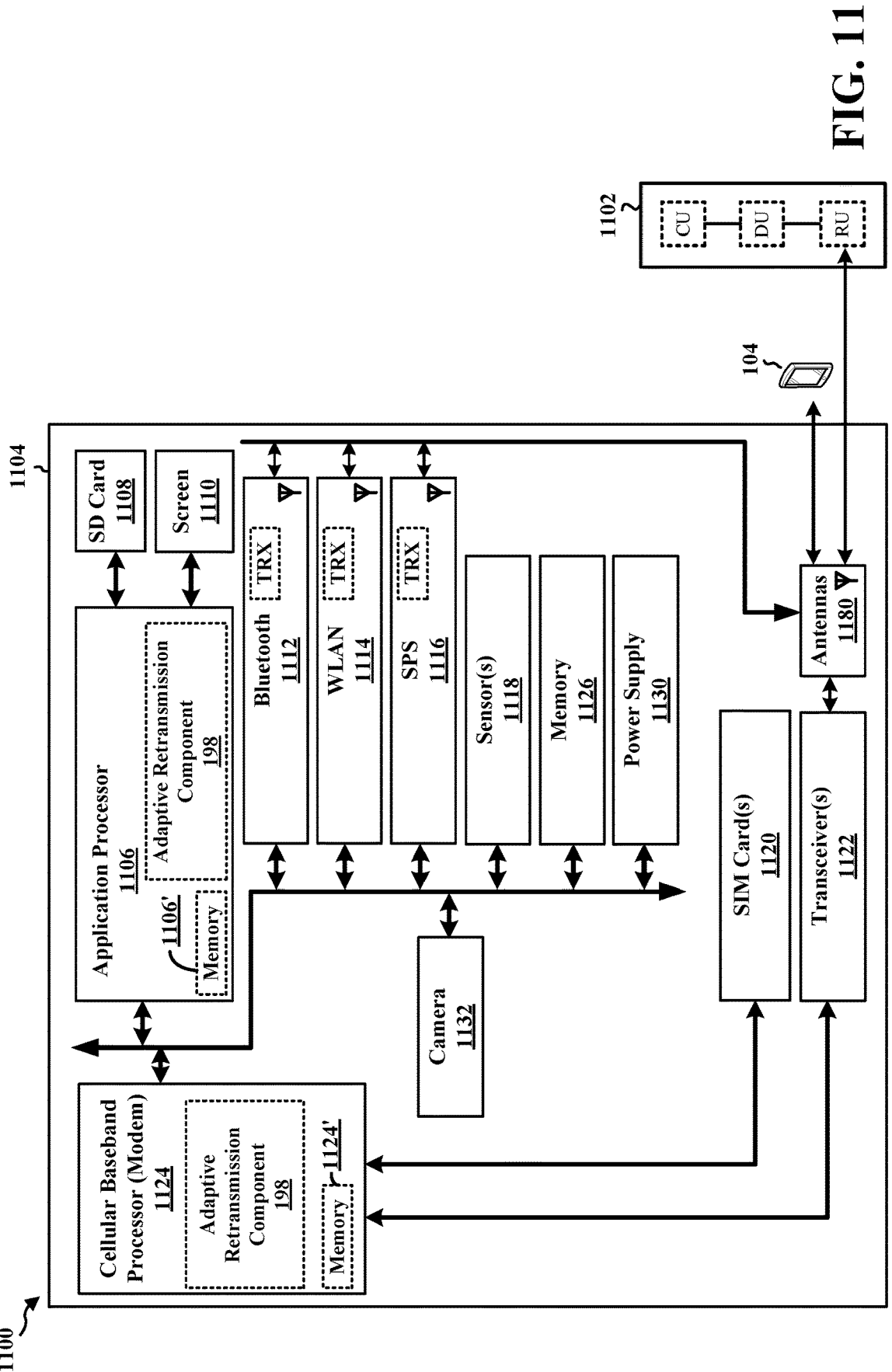
FIG. 11 is a diagram illustrating an example of a hardware implementation for an apparatus.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., sec 350 of FIG. 3) and include the additional modules of the apparatus 1104.

As discussed supra, the adaptive retransmission component 198 is configured to identify that at least one characteristic time associated with a first UL transmission is greater than a threshold time and disable, based on the at least one characteristic time with the first UL transmission being greater than the threshold time, a retransmission capability. The adaptive retransmission component 198 may be within the cellular baseband processor 1124, the application processor 1106, or both the cellular baseband processor 1124 and the application processor 1106. The adaptive retransmission component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for identifying that at least one time period associated with a first UL transmission is greater than a threshold time. The apparatus 1104, and in particular the cellular baseband processor 1124 and/or the application processor 1106, may further include means for disabling a retransmission capability of the wireless device based on the at least one time period associated with the first UL transmission being greater than the threshold time. The apparatus 1104, and in particular the cellular baseband processor 1124 and/or the application processor 1106, may further include means for receiving, from a network node, an indication of the threshold time. The apparatus 1104, and in particular the cellular baseband processor 1124 and/or the application processor 1106, may further include means for transmitting, for a network node that is a destination of the first UL transmission, an indication that the retransmission capability of the wireless device has been disabled. The apparatus 1104, and in particular the cellular baseband processor 1124 and/or the application processor 1106, may further include means for receiving a flipped new data indicator associated with each retransmission in the plurality of retransmissions, wherein the plurality of retransmissions is associated with a plurality of HARQ processes. The apparatus 1104, and in particular the cellular baseband processor 1124 and/or the application processor 1106, may further include means for identifying that the at least one time period associated with at least one logical channel in the plurality of logical channels is greater than a corresponding time in the corresponding plurality of threshold times. The apparatus 1104, and in particular the cellular baseband processor 1124 and/or the application processor 1106, may further include means for disabling, based on the at least one time period associated with the at least one logical channel in the plurality of logical channels being greater than the corresponding time in the corresponding plurality of threshold times, the retransmission capability of the wireless device associated with the at least one logical channel. The apparatus 1104, and in particular the cellular baseband processor 1124 and/or the application processor 1106, may further include means for transmitting, before disabling the retransmission capability of the wireless device, a first DMRS with a first sequence associated with retransmissions for a retransmitted second UL transmission and a second DMRS with a second sequence associated with initial transmissions for the first UL transmission. The apparatus 1104, and in particular the cellular baseband processor 1124 and/or the application processor 1106, may further include means for transmitting, before disabling the retransmission capability of the wireless device, the retransmitted second UL transmission using a first scrambling and the first UL transmission using a second scrambling. The apparatus 1104, and in particular the cellular baseband processor 1124 and/or the application processor 1106, may further include means for identifying that the at least one time period associated with a subsequent UL transmission is less than the threshold time. The apparatus 1104, and in particular the cellular baseband processor 1124 and/or the application processor 1106, may further include means for enabling the retransmission capability of the wireless device based on the at least one time period associated with the subsequent UL transmission being less than the threshold time. The means may be the adaptive retransmission component 198 of the apparatus 1104 configured to perform the functions recited by the means or any of the functions describe in relation to FIGS. 7 and 8. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
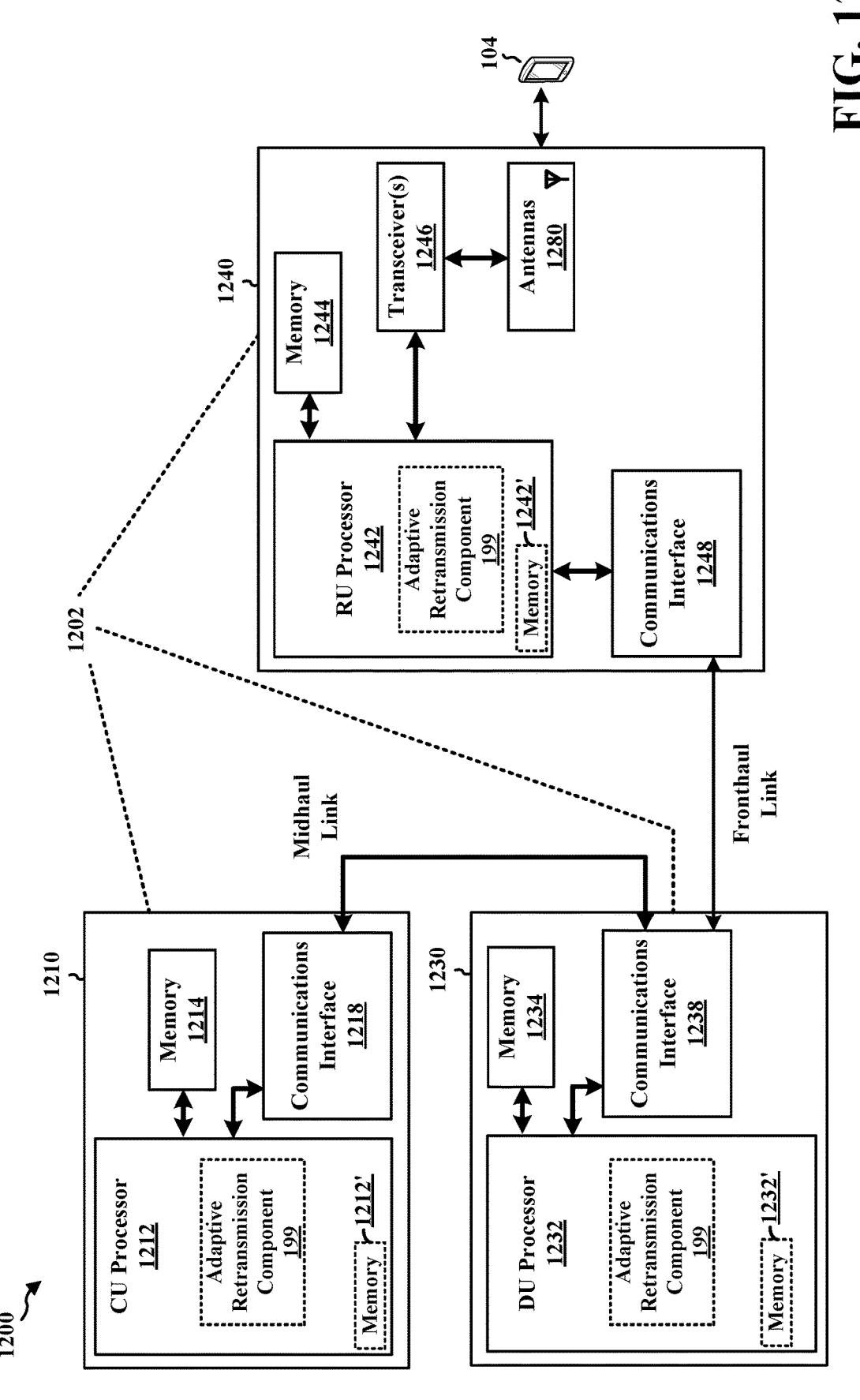
FIG. 12 is a diagram illustrating an example of a hardware implementation for a network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the adaptive retransmission component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the adaptive retransmission component 199 is configured to identify that at least one characteristic time associated with a first DL transmission is greater than a threshold time and disable, based on the at least one characteristic time with the first DL transmission being greater than the threshold time, a retransmission capability. The adaptive retransmission component 199 may be within one or more processors of one or more of the CU 1210, DU 1230, and the RU 1240. The adaptive retransmission component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for identifying that at least one time period associated with a first DL transmission is greater than a threshold time. The network entity 1202 may further include means for disabling a retransmission capability of the network node based on the at least one time period associated with the first DL transmission being greater than the threshold time. The network entity 1202 may further include means for transmitting, to a wireless device, an indication of the threshold time, wherein the indication comprises one or more of a value of the threshold time or a packet delay budget associated with a first UL transmission. The network entity 1202 may further include means for transmitting, for a wireless device, an indication that the network node has disabled the retransmission capability of the network node. The network entity 1202 may further include means for identifying that the at least one time period associated with at least one logical channel in the plurality of logical channels is greater than a corresponding time in the corresponding plurality of threshold times. The network entity 1202 may further include means for disabling, based on the at least one time period associated with the at least one logical channel in the plurality of logical channels being greater than the corresponding time in the corresponding plurality of threshold times, the retransmission capability of the network node associated with the at least one logical channel. The network entity 1202 may further include means for identifying that the at least one time period associated with a subsequent DL transmission is less than the threshold time. The network entity 1202 may further include means for enabling the retransmission capability of the network node based on the at least one time period with the subsequent DL transmission being less than the threshold time. The means may be the adaptive retransmission component 199 of the network entity 1202 configured to perform the functions recited by the means or any of the functions describe in relation to FIGS. 9 and 10. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

In some aspects of wireless communication, e.g., XR in 5G NR, some transmissions have very short periodicity and/or a tight delay requirement may render multiple retransmission impractical. For example, some XR flows on UL, such as pose, may have very short periodicity (e.g., approximately 4 ms) and tight delay budget (e.g., approximately 10 ms), which makes it impractical to have multiple retransmissions. For such XR (or similar) flows, a UE may save power by disabling a retransmission based on an experienced packet delay (e.g., disabling retransmission when an experienced packet delay is greater than the delay budget). When retransmission is disabled, the UE may not initiate retransmission outside DRX active time after a transmission via a CG to save UE power.

In some aspects, a base station may (e.g., by initiating a HARQ Mode B) disable retransmission by a UE for certain types of communication, e.g., NTNs, based on an expectation that a retransmission will occur after a delay budget associated with an initial transmission has expired. Other communication flows with tight delay budgets may also benefit from disabling retransmission (e.g., may conserver power when retransmission occurs after the expiration of a delay budget). However, a naïve extension of HARQ Mode B to other communication with tight delay budgets may reduce a successful packet decoding rate unnecessarily if conditions are sufficient to meet the tight delay budget. Accordingly, a method and apparatus are provided for a UE to adaptively disable and/or enable retransmission based on an experienced packet delay at the UE to provide the benefits of retransmission where delay budgets are currently being met while avoiding the overhead associated with retransmission where delay budgets are not currently being met.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, including identifying that at least one time period associated with a first UL transmission is greater than a threshold time and disabling a retransmission capability of the wireless device based on the at least one time period associated with the first UL transmission being greater than the threshold time.

Aspect 2 is the method of aspect 1, where the at least one time period associated with the first UL transmission is one or more of an uplink queueing delay or a time elapsed from an initial transmission of the first UL transmission.

Aspect 3 is the method of any of aspects 1 and 2, further including receiving, from a network node, an indication of the threshold time, where the indication includes one or more of a value of the threshold time or a packet delay budget associated with the first UL transmission used to derive the threshold time at the wireless device.

Aspect 4 is the method of any of aspects 1 to 3, further including transmitting, for a network node that is a destination of the first UL transmission, an indication that the retransmission capability of the wireless device has been disabled.

Aspect 5 is the method of aspect 4, where the indication is transmitted via one of UCI or a MAC-CE.

Aspect 6 is the method of aspect 5, where the indication is transmitted via the MAC-CE and the MAC-CE is transmitted via one of a HARQ transmission or a second carrier other than a first carrier associated with the first UL transmission, and where the indication indicates the first carrier associated with the first UL transmission.

Aspect 7 is the method of any of aspects 5 and 6, where the indication is transmitted via the MAC-CE and the indication includes a first indication that the retransmission capability of the wireless device has been disabled for a plurality of retransmissions.

Aspect 8 is the method of aspect 7, further including receiving a flipped new data indicator associated with each retransmission in the plurality of retransmissions, where the plurality of retransmissions is associated with a plurality of HARQ processes.

Aspect 9 is the method of any of aspects 7 and 8, where the first UL transmission includes data from a plurality of logical channels, where the plurality of logical channels is associated with a corresponding plurality of threshold times, the method further including identifying that the at least one time period associated with at least one logical channel in the plurality of logical channels is greater than a corresponding time in the corresponding plurality of threshold times and disabling, based on the at least one time period associated with the at least one logical channel in the plurality of logical channels being greater than the corresponding time in the corresponding plurality of threshold times, the retransmission capability of the wireless device associated with the at least one logical channel.

Aspect 10 is the method of any of aspects 1 to 4, 8, and 9, further including transmitting, before disabling the retransmission capability of the wireless device, a first DMRS with a first sequence associated with retransmissions for a retransmitted second UL transmission and a second DMRS with a second sequence associated with initial transmissions for the first UL transmission or transmitting, before disabling the retransmission capability of the wireless device, the retransmitted second UL transmission using a first scrambling and the first UL transmission using a second scrambling.

Aspect 11 is the method of any of aspects 1 to 10, further including identifying that the at least one time period associated with a subsequent UL transmission is less than the threshold time and enabling the retransmission capability of the wireless device based on the at least one time period associated with the subsequent UL transmission being less than the threshold time.

Aspect 12 is a method of wireless communication at a network node, including identifying that at least one time period associated with a first DL transmission is greater than a threshold time and disabling a retransmission capability of the network node based on the at least one time period associated with the first DL transmission being greater than the threshold time.

Aspect 13 is the method of aspect 12, where the at least one time period associated with the first DL transmission is one or more of a downlink queueing delay or a time elapsed from an initial transmission of the first DL transmission.

Aspect 14 is the method of any of aspects 12 and 13, further including transmitting, to a wireless device, an indication of the threshold time, where the indication includes one or more of a value of the threshold time or a packet delay budget associated with a first UL transmission.

Aspect 15 is the method of any of aspects 12 to 14, further including transmitting, for a wireless device, an indication that the network node has disabled the retransmission capability of the network node, where, based on the transmitted indication, at least one of: the wireless device is not to transmit a HARQ ACK associated with at least one DL transmission, the wireless device is to flush a HARQ buffer, or the wireless device is not to monitor for a retransmission of at least the first DL transmission.

Aspect 16 is the method of aspect 15, where the indication that the network node has disabled the retransmission capability of the network node includes a first indication of a time period during which the retransmission capability of the network node has been disabled, where the time period is one of a first time period until a subsequent indication is transmitted, a second time period of a known duration, or a third time period beginning at a first indicated time and ending at a second indicated time.

Aspect 17 is the method of aspects 15 and 16, where the indication is transmitted via one of DCI or a MAC-CE.

Aspect 18 is the method of aspect 17, where the indication is transmitted via the MAC-CE and the MAC-CE is transmitted via one of another HARQ transmission or a second carrier other than a first carrier associated with the first DL transmission, and where the indication indicates the first carrier associated with the first DL transmission.

Aspect 19 is the method of aspects 17 and 18, where the indication is transmitted via the MAC-CE and the indication includes a first indication that the retransmission capability of the network node has been disabled for a plurality of retransmissions.

Aspect 20 is the method of any of aspects 12 to 19, where the first DL transmission includes data from a plurality of logical channels, where the plurality of logical channels is associated with a corresponding plurality of threshold times, the method further including identifying that the at least one time period associated with at least one logical channel in the plurality of logical channels is greater than a corresponding time in the corresponding plurality of threshold times and disabling, based on the at least one time period associated with the at least one logical channel in the plurality of logical channels being greater than the corresponding time in the corresponding plurality of threshold times, the retransmission capability of the network node associated with the at least one logical channel.

Aspect 21 is the method of any of aspects 12 to 20, further including identifying that the at least one time period associated with a subsequent DL transmission is less than the threshold time and enabling the retransmission capability of the network node based on the at least one time period with the subsequent DL transmission being less than the threshold time.

Aspect 22 is an apparatus for wireless communication at a wireless device. The apparatus includes a memory; and at least one processor coupled to the memory and, based at least in part on information stored in the memory, the at least one processor is configured to implement any of aspects 1 to 11.

Aspect 23 is the apparatus of aspect 22, further including at least one of a transceiver or an antenna coupled to the at least one processor.

Aspect 24 is an apparatus for wireless communication including means for implementing any of aspects 1 to 11.

Aspect 25 is a computer-readable medium (e.g., a non-transitory computer-readable medium) storing computer executable code, the code when executed by at least one processor causes the at least one processor to implement any of aspects 1 to 11.

Aspect 26 is an apparatus for wireless communication at a network node. The apparatus includes a memory; and at least one processor coupled to the memory and, based at least in part on information stored in the memory, the at least one processor is configured to implement any of aspects 12 to 21.

Aspect 27 is the apparatus of aspect 26, further including at least one of a transceiver or an antenna coupled to the at least one processor.

Aspect 28 is an apparatus for wireless communication including means for implementing any of aspects 12 to 21.

Aspect 29 is a computer-readable medium (e.g., a non-transitory computer-readable medium) storing computer executable code, the code when executed by at least one processor causes the at least one processor to implement any of aspects 12 to 21.

What is claimed is:

1. An apparatus for wireless communication at a wireless device, comprising:

a memory; and at least one processor coupled to the memory and, based at least in part on information stored in the memory, the at least one processor is configured to:

identify that at least one time period associated with a first uplink (UL) transmission is greater than a threshold time; and disable a retransmission capability of the wireless device based on the at least one time period associated with the first UL transmission being greater than the threshold time.

2. The apparatus of claim 1, wherein the at least one time period associated with the first UL transmission is one or more of an uplink queueing delay or a time elapsed from an initial transmission of the first UL transmission.

3. The apparatus of claim 1, wherein the at least one processor is further configured to:

receive, from a network node, an indication of the threshold time, wherein the indication comprises one or more of a value of the threshold time or a packet delay budget associated with the first UL transmission used to derive the threshold time at the wireless device.

4. The apparatus of claim 1, wherein the at least one processor is further configured to:

transmit, for a network node that is a destination of the first UL transmission, an indication that the retransmission capability of the wireless device has been disabled.

5. The apparatus of claim 4, wherein to transmit the indication, the at least one processor is configured to transmit the indication via one of UL control information (UCI) or a medium access control (MAC) control element (CE) (MAC-CE).

6. The apparatus of claim 5, wherein to transmit the indication, the at least one processor is configured to transmit the indication via the MAC-CE and the MAC-CE is configured to be transmitted via one of a hybrid automatic repeat request (HARQ) transmission or a second carrier other than a first carrier associated with the first UL transmission, and wherein the indication indicates the first carrier associated with the first UL transmission.

7. The apparatus of claim 5, wherein to transmit the indication, the at least one processor is configured to transmit the indication via the MAC-CE and the indication comprises a first indication that the retransmission capability of the wireless device has been disabled for a plurality of potential retransmissions.

8. The apparatus of claim 7, wherein the at least one processor is further configured to:

receive a flipped new data indicator associated with each retransmission in the plurality of potential retransmissions, wherein the plurality of potential retransmissions is associated with a plurality of hybrid automatic repeat request (HARQ) processes.

9. The apparatus of claim 7, wherein the first UL transmission comprises data from a plurality of logical channels, wherein the plurality of logical channels is associated with a corresponding plurality of threshold times, and wherein the at least one processor is further configured to:

identify that the at least one time period associated with at least one logical channel in the plurality of logical channels is greater than a corresponding time in the corresponding plurality of threshold times; and disable, based on the at least one time period associated with the at least one logical channel in the plurality of logical channels being greater than the corresponding time in the corresponding plurality of threshold times, the retransmission capability of the wireless device associated with the at least one logical channel.

10. The apparatus of claim 1, further comprising a transceiver coupled to the at least one processor, wherein the at least one processor is further configured to at least one of:

transmit, via the transceiver before disabling the retransmission capability of the wireless device, a first demodulation reference signal (DMRS) with a first sequence associated with retransmissions for a retransmitted second UL transmission and a second DMRS with a second sequence associated with initial transmissions for the first UL transmission; or transmit, via the transceiver before disabling the retransmission capability of the wireless device, the retransmitted second UL transmission using a first scrambling and the first UL transmission using a second scrambling.

11. The apparatus of claim 1, wherein the at least one processor is further configured to:

identify that the at least one time period associated with a subsequent UL transmission is less than the threshold time; and enable the retransmission capability of the wireless device based on the at least one time period associated with the subsequent UL transmission being less than the threshold time.

12. An apparatus for wireless communication at a network node, comprising:

a memory; and at least one processor coupled to the memory and, based at least in part on information stored in the memory, the at least one processor is configured to:

identify that at least one time period associated with a first downlink (DL) transmission is greater than a threshold time; and disable a retransmission capability of the network node based on the at least one time period associated with the first DL transmission being greater than the threshold time.

13. The apparatus of claim 12, wherein the at least one time period associated with the first DL transmission is one or more of a downlink queueing delay or a time elapsed from an initial transmission of the first DL transmission.

14. The apparatus of claim 12, wherein the at least one processor is further configured to:

transmit, to a wireless device, an indication of the threshold time, wherein the indication comprises one or more of a value of the threshold time or a packet delay budget associated with a first uplink (UL) transmission.

15. The apparatus of claim 12, further comprising a transceiver coupled to the at least one processor, wherein the at least one processor is further configured to:

transmit, via the transceiver for a wireless device, an indication that the network node has disabled the retransmission capability of the network node, wherein, based on the transmitted indication, at least one of: the wireless device is not to transmit a hybrid automatic repeat request (HARQ) acknowledgement (ACK) associated with at least one DL transmission, the wireless device is to flush a HARQ buffer, or the wireless device is not to monitor for a retransmission of at least the first DL transmission.

16. The apparatus of claim 15, wherein the indication that the network node has disabled the retransmission capability of the network node comprises a first indication of a time period during which the retransmission capability of the network node has been disabled, wherein the time period is one of a first time period until a subsequent indication is transmitted, a second time period of a known duration, or a third time period beginning at a first indicated time and ending at a second indicated time.

17. The apparatus of claim 15, wherein to transmit the indication, the at least one processor is configured to transmit the indication via one of DL control information (DCI) or a medium access control (MAC) control element (CE) (MAC-CE).

18. The apparatus of claim 17, wherein to transmit the indication, the at least one processor is configured to transmit the indication via the MAC-CE and the MAC-CE is transmitted via one of a HARQ transmission or a second carrier other than a first carrier associated with the first DL transmission, and wherein the indication indicates the first carrier associated with the first DL transmission.

19. The apparatus of claim 17, wherein to transmit the indication, the at least one processor is configured to transmit the indication via the MAC-CE and the indication comprises a first indication that the retransmission capability of the network node has been disabled for a plurality of retransmissions.

20. The apparatus of claim 12, wherein the first DL transmission comprises data from a plurality of logical channels, wherein the plurality of logical channels is associated with a corresponding plurality of threshold times, and wherein the at least one processor is further configured to:

identify that the at least one time period associated with at least one logical channel in the plurality of logical channels is greater than a corresponding time in the corresponding plurality of threshold times; and disable, based on the atleastone time period associated with the at least one logical channel in the plurality of logical channels being greater than the corresponding time in the corresponding plurality of threshold times, the retransmission capability of the network node associated with the at least one logical channel.

21. The apparatus of claim 12, wherein the at least one processor is further configured to:

identify that the at least one time period associated with a subsequent DL transmission is less than the threshold time; and enable the retransmission capability of the network node based on the at least one time period with the subsequent DL transmission being less than the threshold time.

22. A method of wireless communication at a wireless device, comprising:

identifying that at least one time period associated with a first uplink (UL) transmission is greater than a threshold time; and disabling a retransmission capability of the wireless device based on the at least one time period associated with the first UL transmission being greater than the threshold time.

23. The method of claim 22, wherein the at least one time period associated with the first UL transmission is one or more of an uplink queueing delay or a time elapsed from an initial transmission of the first UL transmission, the method further comprising:

receiving, from a network node, an indication of the threshold time, wherein the indication comprises one or more of a value of the threshold time or a packet delay budget associated with the first UL transmission used to derive the threshold time at the wireless device.

24. The method of claim 22, further comprising:

transmitting, for a network node that is a destination of the first UL transmission, an indication that the retransmission capability of the wireless device has been disabled, wherein the indication is transmitted via one of UL control information (UCI) or a medium access control (MAC) control element (CE) (MAC-CE).

25. The method of claim 24, wherein the indication is transmitted via the MAC-CE and the indication comprises a first indication that the retransmission capability of the wireless device has been disabled for a plurality of retransmissions.

26. The method of claim 22, further comprising at least one of:

transmitting, before disabling the retransmission capability of the wireless device, a first demodulation reference signal (DMRS) with a first sequence associated with retransmissions for a retransmitted second UL transmission and a second DMRS with a second sequence associated with initial transmissions for the first UL transmission; or transmitting, before disabling the retransmission capability of the wireless device, the retransmitted second UL transmission using a first scrambling and the first UL transmission using a second scrambling.

27. A method of wireless communication at a network node, comprising:

identifying that at least one time period associated with a first downlink (DL) transmission is greater than a threshold time; and disabling a retransmission capability of the network node based on the at least one time period associated with the first DL transmission being greater than the threshold time.

28. The method of claim 27, wherein the at least one time period associated with the first DL transmission is one or more of a downlink queueing delay or a time elapsed from an initial transmission of the first DL transmission.

29. The method of claim 27, further comprising:

transmitting, for a wireless device, an indication that the network node has disabled the retransmission capability of the network node, wherein, based on the transmitted indication, at least one of: the wireless device is not to transmit a hybrid automatic repeat request (HARQ) acknowledgement (ACK) associated with at least one DL transmission, the wireless device is to flush a HARQ buffer, or the wireless device is not to monitor for a retransmission of at least the first DL transmission.

30. The method of claim 29, wherein the indication is transmitted via one of DL control information (DCI) or a medium access control (MAC) control element (CE) (MAC-CE).

* * * * *